(12) United States Patent
Gilbert

(10) Patent No.: US 10,789,793 B2
(45) Date of Patent: Sep. 29, 2020

(54) UNIVERSAL LOCKING DEVICE AND FIREARM LOCKING DEVICE

(71) Applicant: Terrance R. Gilbert, Punta Gorda, FL (US)

(72) Inventor: Terrance R. Gilbert, Punta Gorda, FL (US)

( * ) Notice: Subject to any disclaimer, the term of this patent is extended or adjusted under 35 U.S.C. 154(b) by 15 days.

(21) Appl. No.: 16/223,189

(22) Filed: Dec. 18, 2018

(65) Prior Publication Data
US 2019/0340856 A1 Nov. 7, 2019

Related U.S. Application Data

(60) Provisional application No. 62/665,837, filed on May 2, 2018.

(51) Int. Cl.
*G07C 9/00* (2020.01)
*E05B 47/00* (2006.01)

(52) U.S. Cl.
CPC ...... *G07C 9/00309* (2013.01); *E05B 47/0012* (2013.01); *E05B 2047/0067* (2013.01);
(Continued)

(58) Field of Classification Search
CPC ...... G07C 9/00309; G07C 2009/00539; G07C 2009/00373; G07C 2009/0038;
(Continued)

(56) References Cited

U.S. PATENT DOCUMENTS

| 4,785,425 A | 11/1988 | Lavelle |
| 5,548,915 A | 8/1996 | Szarmach et al. |

(Continued)

FOREIGN PATENT DOCUMENTS

WO 2016027178 2/2016

OTHER PUBLICATIONS

U.S. Appl. No. 62/090,544, filed Dec. 11, 2014 for "Locking Device with an Alarm and Tracking System".
(Continued)

*Primary Examiner* — Ryan W Sherwin
(74) *Attorney, Agent, or Firm* — Ware, Fressola, Maguire & Barber LLP

(57) ABSTRACT

A locking device includes a locking mechanism configured to lock and unlock different types of objects upon a corresponding command from a separate remote device such as a smartphone controlled by a user and running an application program. A motion sensor senses any physical motion of the locking device, and an alarm provides a visual and/or audible alarm upon sensed motion or tampering of the locking device. A location tracker (GPS) continuously senses a location of the locking device. A communication module is in two-way (cellular) signal communication with the remote device, which transmits signals to the communication module indicative of a user command to lock and unlock the locking mechanism. The communication module transmits signals to the remote device indicative of a status of various parameters of the locking device. A processor is configured for signal processing of the various signals within the locking device.

1 Claim, 13 Drawing Sheets

(52) U.S. Cl.
CPC ............... *E05B 2047/0071* (2013.01); *G07C 2009/0038* (2013.01); *G07C 2009/00373* (2013.01); *G07C 2009/00539* (2013.01); *G07C 2209/62* (2013.01)

(58) Field of Classification Search
CPC ............ G07C 2209/62; E05B 47/0012; E05B 2047/0071; E05B 2047/0067
See application file for complete search history.

(56) References Cited

U.S. PATENT DOCUMENTS

| | | |
|---|---|---|
| 7,038,585 B2 | 5/2006 | Hall et al. |
| 9,556,651 B1 | 1/2017 | Cabral Herrera |
| 9,784,016 B1 | 10/2017 | Cabral Herrera |
| 2010/0283575 A1* | 11/2010 | Tubb ................ E05B 39/00 340/5.1 |
| 2013/0150028 A1 | 6/2013 | Akins et al. |
| 2014/0000322 A1 | 1/2014 | Williams |
| 2014/0266588 A1 | 9/2014 | Majzoobi |
| 2016/0180621 A1* | 6/2016 | Desinor, Jr. ........ G07C 9/00896 |
| 2016/0292938 A1* | 10/2016 | Zakaria ............. G07C 9/00571 |
| 2017/0085688 A1* | 3/2017 | Zhou ................... H04M 1/0268 |
| 2017/0109953 A1* | 4/2017 | Mullane ............. G07C 9/00309 |
| 2017/0140594 A1* | 5/2017 | Zastrow ............. G07C 9/00309 |

OTHER PUBLICATIONS

BitLock Bicycle Lock—http://bitlock.co.
Ellipse Bicycle Lock—https://www.lattis.io/products/ellipse.
Linka Bicycle Lock—https://www.linkalock.com/pages/linka-leo.

\* cited by examiner

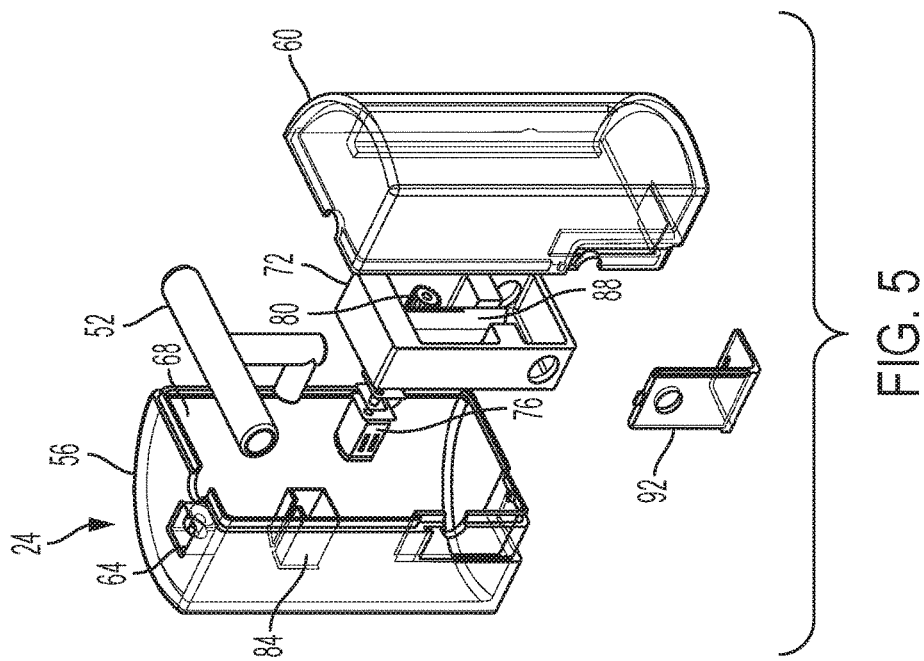
FIG. 5
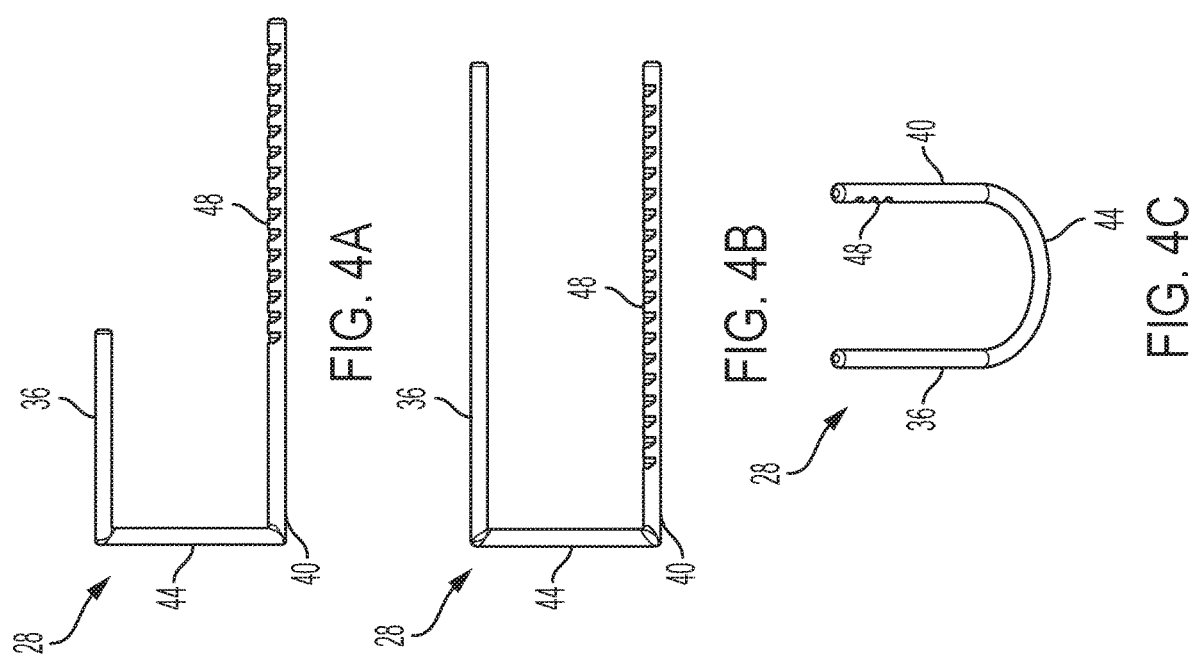
FIG. 4A
FIG. 4B
FIG. 4C

UNIVERSAL LOCKING DEVICE AND FIREARM LOCKING DEVICE

CROSS-REFERENCE TO RELATED APPLICATIONS

The present application claims the benefit of U.S. Provisional Patent Application No. 62/665,837, filed May 2, 2018, the contents of which are incorporated by reference herein.

BACKGROUND

Embodiments of the present invention relate to locking devices, and more specifically, to a universal locking device that may be used to quickly and easily securely lock and unlock a wide variety of different objects for selective, permissioned, controlled access thereto. The objects may include a wide variety of personal belongings, for example, firearms of different types (e.g., long guns, handguns), bicycles, motorcycles, various types of sporting equipment (e.g., skis, golf clubs), luggage, marine equipment, etc. Embodiments of the universal locking device of the present invention essentially may be used on any type of object where it has been known in the past to use an ordinary padlock or similar type of known lock (e.g., chain or cable lock) to secure the object with varying degrees of successful security to thereby prevent against theft of the object.

In the case of firearms, the universal locking device of embodiments of the present invention effectively disables and prevents unauthorized operation of the firearm which, if such operation occurred, could result in serious injury or death. The universal locking device may also include an alarm (e.g., an audible alarm having a relatively loud decibel level and/or a visual alarm) as part of the device itself that is activated if the locked object is tampered with or moved away, e.g., a certain distance, from a location (e.g., a "safe" location) in an unauthorized manner. The tampering or unauthorized movement of the universal locking device may be determined by, e.g., a closed electrical circuit that becomes opened and, thus, activated by the tampering action. In the alternative, the tampering or unauthorized movement may be determined, for example, by a motion sensor such as an accelerometer. Thus, the tampering electrical circuit and the motion sensor act as theft detection components.

The universal locking device may further include a location tracker (e.g., global positioning system—GPS) that may be concealed within the universal locking device and which may be used to track the current location of the locking device and, thus, of the locked object in real time to thereby aid in the recovery of the locked object if it has been stolen. The universal locking device may also include a microcontroller or processor that may be used to interface with the various locking device components and systems and to process all of the data or information needed for proper operation of the universal locking device.

The universal locking device may be controlled remotely by a smartphone or other type of mobile device (e.g., tablet, notebook, or laptop computer) having an application program which is operated by a user. The application program may be such that the user controls the entire operation of the universal locking device through use of the application program running on the smartphone. The smartphone may be located anywhere in the world with respect to the universal locking device as the universal locking device and the smartphone are in cellular communication with one another. The application program may prompt the user to enter his/her user ID and password in order to operate and control the universal locking device, thereby protecting against unauthorized usage of the universal locking device.

Specifically, the remote mobile device allows the authorized user to selectively lock and unlock a locking mechanism (e.g., a shackle) which is part of the universal locking device and, thus, the corresponding object that the locking device is being used with. The remote mobile device may also provide the user with visual and/or audible status information such as, for example, whether the universal locking device is locked or unlocked with respect to an object, and an alarm condition of the locking device (i.e., the mobile device may simultaneously have an alarm condition indicated to the user on the remote mobile device as well as the aforementioned alarm that is part of the universal locking device). Other status information conveyed to the user may include the current tracked location of the universal locking device and, thus, of the corresponding locked object, and the amount of battery life left in the universal locking device. The battery utilized may be rechargeable. The universal locking device may communicate with the smartphone or other remote mobile device by two-way cellular communications or other type of reliable and widely-available wireless communication capability. The data or information communicated between the universal locking device and the remote mobile device may be encrypted to provide for an increased level of security during data transmission and storage, e.g. in a cloud storage area.

Specifically, in operation the universal locking device notifies the user's smartphone when someone tampers with or moves the universal locking device and, thus, the locked object (i.e., theft detection). Each mobile remote device may control a plurality of universal locking devices, for example, through a scheme for uniquely identifying each universal locking device to the mobile remote device, for example, thorough use of a unique IMEI (International Mobile Equipment Identity) 15 digit number assigned to each one of the universal locking devices. Thus, in light of the foregoing, the universal locking device of embodiments of the present invention locks an object, provides an alarm if someone tampers with or moves the locking device and corresponding locked object, and tracks the location of the universal locking device and, thus, the locked object (i.e., Locks, Alarms and Tracks—LAT).

Also, the universal locking device of embodiments of the present invention may be connected with a large plurality of other types of devices in an Internet of Things ("IoT") configuration. This allows the universal locking device to interact in real time with various other devices, including various types of home security systems and/or other locking systems. Further, even though the universal locking device of embodiments of the present invention virtually eliminates the need for a traditional physical key and lock combination to operate the device, as a secondary fallback position, a manual physical key and lock may be used to lock and unlock the universal locking device in the event of a malfunction of the application program running on the smartphone or some other problematic situation (e.g., low battery level in the universal locking device).

In modern society, the unauthorized usage of firearms is a major and growing problem. This is a particular concern with the increasing prevalence of children gaining access to loaded and unlocked or unsecured firearms kept in a home or other location and then accidentally shooting themselves and/or someone else, thereby killing or seriously injuring themselves and/or others. It is also a major concern with adults stealing the unlocked firearms and then using them in an illegal manner. Most often when firearms are stolen they are not recovered. Sadly, this is oftentimes still the case when various types of modern firearm locking devices are used in an attempt to secure the firearm from theft and subsequent unauthorized usage. This is due in general to the inadequacy of these modern firearm locking devices in properly protecting the firearms from such unauthorized usage by not only adults but also children. As such, these modern firearm locking devices oftentimes fail to adequately act as the safety devices that they were intended to be.

In the modern art of locking devices for use with firearms, one common mechanism for preventing unauthorized usage of the firearm is one that prevents or blocks movement of the firing pin and thereby prevents the firearm from being loaded with ammunition (e.g., a cable lock). Another common type of mechanism for preventing unauthorized usage of the firearm is a trigger lock that prevents the trigger of the firearm from being deployed, thereby preventing release of the hammer.

Yet another type of modern gun safety device is based on smart gun technology which includes safety features integrated into the firearm. These features are intended to only allow authorized users to fire to firearm. The goal of smart gun technology is to keep guns safe from the hands of children or any person who can misuse them. They can also prevent accidental shootings and gun thefts. However, modern smart gun technology is not relatively reliable as it depends on biometrics (e.g., fingerprints of an authorized user), which oftentimes is inaccurate and prone to errors.

These and other types of technologies and mechanisms/devices for preventing unauthorized usage of a firearm are largely ineffective in that they can be bypassed or defeated relatively easily even by children and have also been demonstrated to be vulnerable against various unlocking methods, such as a person using tools to essentially fully or partially remove the locking device from the firearm. For example a cable lock can be quickly and easily cut with readily available cutters. In addition, these modern firearm locking mechanisms lack the ability to communicate both their locked and location status to a remote device such as a smartphone.

Another common problem with modern locking devices for firearms is the inherent nature of the different types, shapes and sizes of firearms. For example, there are many different types, shapes and sizes of handguns available (e.g., manual revolvers, 9 mm semiautomatic rifles, etc.) as well as long guns (e.g., manual pump shotguns, semiautomatic assault rifles, fully automatic machine guns, etc.). As a result, different modern firearm locking devices are typically designed and manufactured for each of the specific types, shapes and sizes of modern firearms. Thus, if someone owns several different types of firearms, that person must purchase a number of various specific types of locking devices. In other words, what is lacking is a firearm locking device that is relatively more universal in that it can be used with a plurality of various types, shapes and sizes of firearms and not just with a single type, shape and size of firearm. Other problems with modern firearm locking devices include the fact that many of them are relatively complex and, thus, difficult to use.

Thus, objects of embodiments of the universal locking device of the present invention include keeping a wide variety of various objects safe at all times and notifying or alerting users of the universal locking device of the status of the corresponding locked objects, including that the object has been moved from a certain location, and, thus, has been stolen. Other more general objects of embodiments of the universal locking device of the present invention include, with respect to various and numerous types of consumer goods, safeguarding property, deterring theft, controlling access, reducing liability and aiding recovery.

SUMMARY

According to an embodiment of the present invention, a locking device includes a locking mechanism configured to physically interact with any one of a plurality of different types of objects to thereby lock and unlock the any one of a plurality of different objects upon a corresponding command communicated from a remote device controlled by a user, wherein the remote device is separate from the locking device.

The locking device also includes a motion sensor configured to sense any physical motion of the locking device and to provide a sensed motion signal indicative thereof; and an alarm responsive to the sensed motion signal and configured to provide at least one of a visual and audible alarm signal upon an occurrence of at least one predetermined condition corresponding with a sensed physical motion of the locking device.

The locking device further includes a location tracker configured to continuously sense a location in physical space of the locking device and to provide a location signal indicative thereof; and a communication module configured to be in two-way signal communication with the remote device; wherein the remote device transmits a plurality of signals to the communication module, one or more of the transmitted plurality of signals to the communication module being indicative of a corresponding one or more commands from the user to operate the locking device to lock and unlock the locking mechanism; and wherein the communication module transmits a plurality of signals to the remote device, one or more other ones of the transmitted plurality of signals to the remote device being indicative of a status of a corresponding one or more parameters of the locking device.

The locking device also includes a processor configured to be responsive to and for signal processing of the sensed motion signal, the at least one visual and audible alarm signal, the location signal, the one or more of the transmitted plurality of signals to the communication module, and the one or more of the transmitted plurality of signals to the remote device.

These and other advantages and features will become more apparent from the following description taken in conjunction with the drawings.

BRIEF DESCRIPTION OF THE DRAWINGS

The subject matter, which is regarded as the disclosure of the invention, is particularly pointed out and distinctly claimed in the claims at the conclusion of the specification. The forgoing and other features, and advantages of the invention are apparent from the following detailed description taken in conjunction with the accompanying drawings in which:

FIGS. 4A-4C are front views of a shackle portion of the universal locking device in accordance with various embodiments of the present invention;

FIG. 5 is an exploded view of a case portion of the universal locking device in accordance with an embodiment of the present invention;

DETAILED DESCRIPTION

Figure 1:
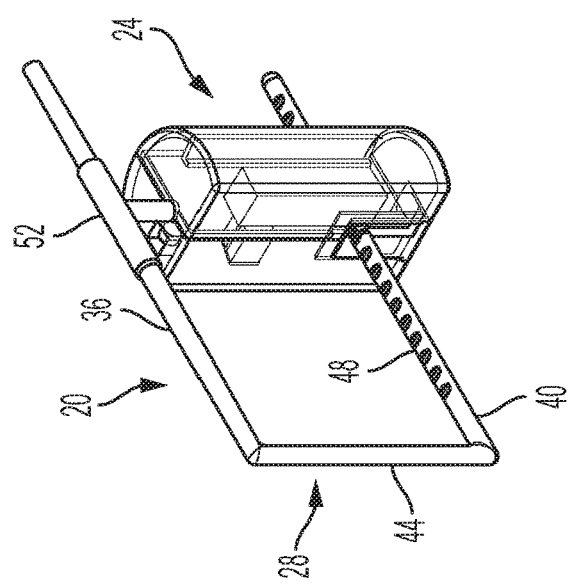
FIG. 1 is a perspective view of a universal locking device in accordance with an embodiment of the present invention.

Referring to FIG. 1, there illustrated is a perspective view of a universal locking device 20 in accordance with an embodiment of the present invention. The universal locking device 20 may include a case or central housing portion 24 and a shackle portion 28 in accordance with various embodiments of the present invention. As described and illustrated in more detail hereinafter, the case 24 may contain the various electrical, electronic, mechanical and electromechanical components and circuitry that control the functionality and operation of the universal locking device 20. In turn, the generally U-shaped shackle 28 connects with the case 24 and is movable with respect to the case 24 as the shackle 28 is utilized to lock or unlock an object (not shown). The case 24 and the shackle 28 may, thus, be considered to comprise the locking mechanism of the universal locking device 28 of embodiments of the present invention. By having the shackle 28 movable with respect to case 24, the universal locking device 20 of embodiments of the present invention is able to adjust the size of the opening 32 defined by arms 36, 40, 44 of the U-shaped shackle 28 (i.e., an upper arm 36, a lower arm 40, and a connecting arm 44). This size flexibility allows the universal locking device 20 of embodiments of the present invention to secure a plurality of objects of different types, shapes and sizes. As such, embodiments of the universal locking device 20 of the present invention, such as that of FIG. 1, can be relatively more universal in that the locking device 20 is not constrained like prior art locking devices to be used with only one object or a relatively small number of objects of different types, shapes and sizes. Various embodiments of different objects to be locked by the universal locking device 20 of embodiments of the present invention, such as firearms, bicycles, etc., are described and illustrated in more detail hereinafter.

It is contemplated that embodiments of the universal locking device 20 of the present invention are for use both indoors and outdoors. Thus, the material utilized for the case 24 is recommended to be able to withstand various harsh outdoor environments, such as relatively hot and cold temperatures, rain, snow, water, corrosive environments, and other adverse conditions that could affect the operation of the universal locking device 20. The case material should also be able to withstand relatively large applied pressures and impact forces. Thus, the case material is preferably weather resistant and secure.

According to an embodiment of the present invention, the case material may comprise a nylon material such as, for example, a 30% fiber filled nylon material, which is relatively lightweight while also providing for relatively great mechanical strength. Fiberglass induced nylon has been shown to be a suitable replacement for non-ferrous metals. Regular forms of nylon absorb more water than glass-filled nylon forms, which allows the nylon to provide relatively better stability and rigidity than other alternatives.

However, it is to be understood that other suitable materials may be utilized for the material that comprises the case 24, in light of the teachings herein. Further, in accordance with embodiments of the present invention, the universal locking device 20 of FIG. 1 may have the case 24 rounded on one side and flat on another side. However, other physical shapes of the case 24 are contemplated by embodiments of the present invention.

The shackle 28 may comprise a material that provides for a relatively high amount of corrosion resistance as well as be of relatively high strength so as to withstand deliberate attempts at bending, breaking or cutting through the shackle material. According to an embodiment of the present invention, the material for the shackle 28 may comprise chrome stainless steel, in which the added chromium serves to decrease the amount of oxidation of the steel, which thereby makes the chrome stainless steel a weather resistant material with a relatively greater resistance to bending forces. However, it is to be understood that the shackle material is not limited to chrome stainless steel in the broadest scope of the present invention. Other suitable materials may be utilized, such as, for example, titanium. The materials chosen for both the case 24 and the shackle 28 may be such that the resulting universal locking device 20 of embodiments of the present invention is relatively easy for a person to carry either in-hand, inside of a backpack or a carry-on bag, etc.

As mentioned and as described and illustrated in more detail hereinafter, the shackle 28 is movable with respect to the case 24 by way of a latch mechanism driven by a motor, wherein a plurality of saw tooth like notches formed in the latch engage with a plurality of similar saw tooth like notches 48 formed in at least one of the arms 36, 40, 44 (e.g., the lower arm 40) of the U-shaped shackle 28, as seen in FIG. 1. Specifically, as illustrated in FIG. 1, the lower arm 40 of the shackle 28 (i.e., the arm 40 with the notches 48 formed therein) passes through aligned holes formed in the case 24, while the upper arm 36 of the shackle 28 passes through a hole in a tubular extension 52 attached at one end (e.g., the top end as viewed in FIG. 1) of the case 24. Thus, in the embodiment of the universal locking device 20 of FIG. 1, the configuration of the shackle 28 with respect to the case 24 is such that a relatively large amount of variation in the size of the opening 32 formed by the arms 36, 40, 44 of the shackle 28 with respect to the case 24 is possible. This is due to the relatively large amount of movement of the shackle 28 with respect to the case 24 while the shackle 28 is in a locking position with respect to the case 24 (i.e., the locking mechanism of the universal locking device 20). This allows for the accommodation of a wide variety of objects of types, shapes and sizes to be locked by the locking mechanism of the universal locking device 20 of embodiments of the present invention. It is to be understood that the notches 48 may be formed in the upper arm 36 instead of the lower arm 40, in light of the teachings herein.

The shackle 28 may comprise a unitary piece of material having a bore hole formed there through along the entire length of the shackle 28. In the alternative, the shackle 28 may comprise two opposite halves of material joined together and having a resulting bore hole formed there through along the entire length of the shackle 28. This is described and illustrated in greater detail with respect to the embodiment of FIG. 14 in which a wire may be disposed within the entire length of the bore hole. The wire may connect with a microcontroller or processor to form a theft detection circuit that operates by sensing or detecting any unauthorized tampering of the universal locking device 20 by way of a breaking of the wire connection with the microcontroller.

Figure 2:
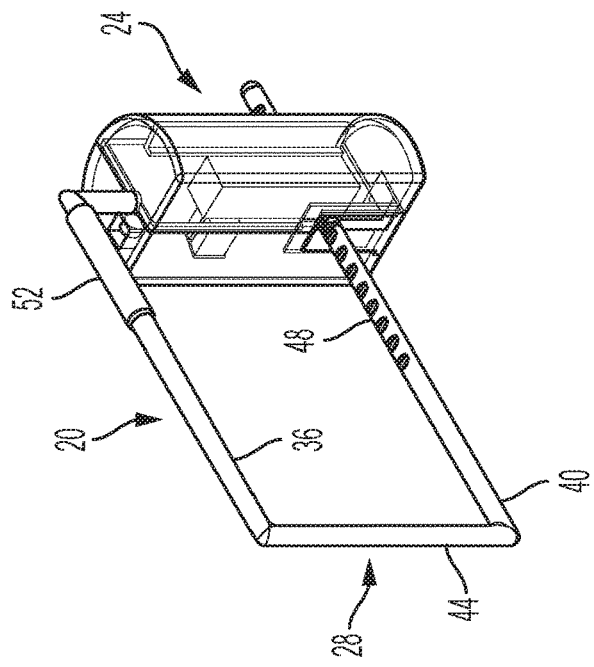
FIG. 2 is a perspective view of a universal locking device in accordance with another embodiment of the present invention.

Referring to FIG. 2, there illustrated is a perspective view of a universal locking device 20 in accordance with another embodiment of the present invention. The embodiment of the universal locking device 20 of FIG. 2 is similar to the embodiment of the universal locking device 20 of FIG. 1. The primary differences are that the upper arm 36 of the shackle 28 of the universal locking device 20 of FIG. 2 is shorter in length than the upper arm 36 of the shackle 28 of the universal locking device 20 of FIG. 1. Also, the tubular extension 52 attached at one end of the case 24 is configured such that the upper arm 36 of the shackle 28 only moves a relatively shorter distance as compared to the embodiment of FIG. 1. This results in a relatively much smaller amount of movement of the shackle 28 with respect to the case 24 while the shackle 28 is in a locking position with respect to the case 24. Thus, the locking mechanism of the configuration of the universal locking device 20 of the embodiment of FIG. 2 is intended to lock relatively smaller objects as compared to the embodiment of the universal locking device 20 of FIG. 1.

Figure 3:
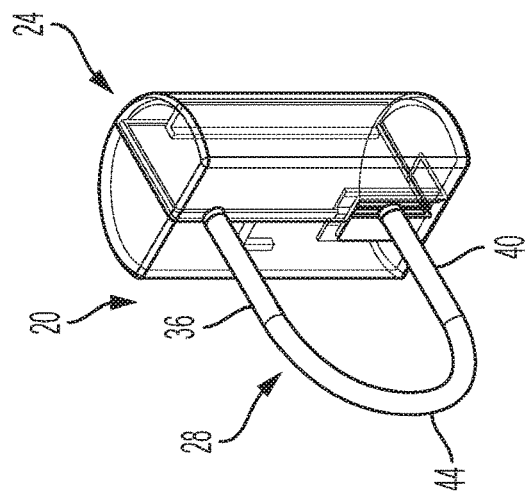
FIG. 3 is a perspective view of a universal locking device in accordance with yet another embodiment of the present invention.

Referring to FIG. 3, there illustrated is a perspective view of a universal locking device 20 in accordance with yet another embodiment of the present invention. In this embodiment, the connecting arm 44 of the shackle 28 is curved instead of straight as in the embodiments of FIGS. 1 and 2. Also, both the upper arm 36 and the lower arm 40 pass through corresponding aligned holes in the case 24. Further, similar to the embodiments of FIGS. 1 and 2, the lower arm 40 has the notches 48 formed therein, although the embodiment shown in FIG. 3 is such that the notches 48 are located entirely within the case 24 and, thus, are not seen in FIG. 3. The curved connecting arm 44 of the shackle 28 allows the universal locking device 20 of the embodiment of FIG. 3 to be utilized with a large variety of different types and sizes of objects.

In the embodiments of the universal locking device 20 of the present invention described and illustrated thus far in FIGS. 1-3, the arms 36, 40, 44 that comprise the shackle 28 have all been rigid members. However, in alternative embodiments one or more of the arms 36, 40, 44 may comprise flexible members such as a metal cable.

Referring to FIGS. 4A-4C, there illustrated are front views of various embodiments of the shackle 28 used as part of the embodiments of the universal locking device 20 of FIGS. 1-3 in accordance with the present invention. FIG. 4A illustrates the shackle 28 of the embodiment of FIG. 2. FIG. 4B illustrates the shackle 28 of the embodiment of FIG. 1. FIG. 4C illustrates the shackle 28 of the embodiment of FIG. 3.

Referring to FIG. 5, there illustrated is an exploded view of a case 24 of the universal locking device 20 in accordance with an embodiment of the present invention. The case 24 may be formed as two separate halves 56, 60 (i.e., a right half 56 and a left half 60) that connect together when the case 24 is assembled. The case 24 includes the tubular extension 52 through which the upper arm 36 passes, similar to that of the embodiment of the universal locking device 20 of FIG. 1. The tubular extension 52 may attach to a mounting base 64 located on an inner surface 68 of the right half 56 of the case 24.

The case 24 may also include a base 72 that is generally located in the center of the case 24. Mounted to the base 72 is a DC motor 76 and a spur gear 80. The motor 76 may also attach to another mounting base 84 located on the inner surface 68 of the right half 56 of the case 24. The rotating shaft of the motor 76 is attached to and drives the spur gear 80 in either a clockwise direction or a counter clockwise direction. Teeth on the spur gear 80 mesh with corresponding teeth formed on a latch 88. When the spur gear 80 is moved by the motor 76, the latch 88 moves in either one of two linear directions—either towards the lower arm 40 (not shown in FIG. 5—see FIGS. 1 and 13) of the shackle 28 or away from the lower arm 40 of the shackle 28. When the latch 88 moves towards the lower arm 40 of the shackle 28, the latch 88 ultimately comes into contact with one of the notches 48 formed in the lower arm 40 of the shackle 28. In contrast, when the latch 88 moves away from the lower arm 40 of the shackle 28, the latch 88 is no longer in physical contact with one of the notches 48 formed in the lower arm 40 of the shackle 28. This is described and illustrated in more detail hereinafter with respect to FIG. 13. The case 24 may also include a locking slot 92 that helps connect together the two halves 56, 60 of the case 24.

Figure 6:
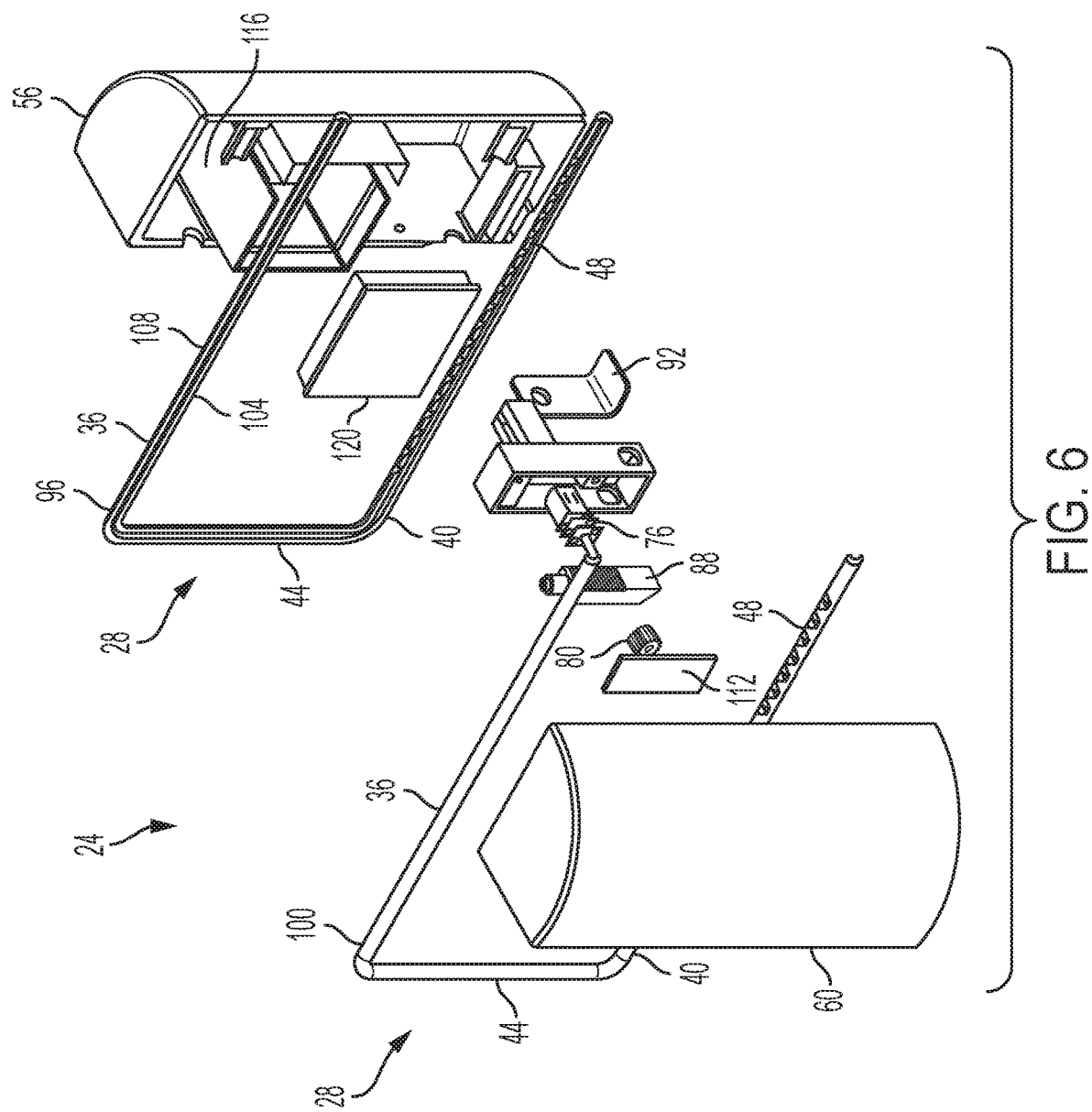
FIG. 6 is an exploded view of a case portion of the universal locking device in accordance with another embodiment of the present invention.

Referring to FIG. 6, there illustrated is an exploded view of a case 24 of the universal locking device 20 in accordance with another embodiment of the present invention. The embodiment illustrated in FIG. 6 is somewhat similar to the embodiment illustrated in FIG. 5. FIG. 6 illustrates the right half 56 and the left half 60 of the case 24. FIG. 6 also illustrates the shackle 28 divided into two halves—a top half 96 and a bottom half 100. From this it can be better seen that the bore hole 104 discussed hereinabove with respect to FIG. 1 exists inside of the arms 36, 40, 44 forming the shackle 28. As discussed with respect to FIG. 1, a wire 108 may be disposed within this bore hole 104 to form a part of the tamper detection circuit, as described and illustrated in greater detail with respect to FIG. 14.

The embodiment of FIG. 6 also includes the base 72, DC motor 76, spur gear 80 and locking slot 92, as discussed and illustrated hereinabove with respect to FIG. 5. The spur gear 80 may be attached to a base cover 112. The right half 56 of the case 24 includes various mounting structures 116 attached to the inner surface 68 of the right half 56. The microcontroller and other electronic devices, such as the cellular communication and GPS locating component or integrated circuit, described in more detail hereinafter, may be disposed inside of a covered structure 120, which then fits into one of the mounting structures 116 on the inner surface 68 of the right half 56 of the case 24.

Figure 7:
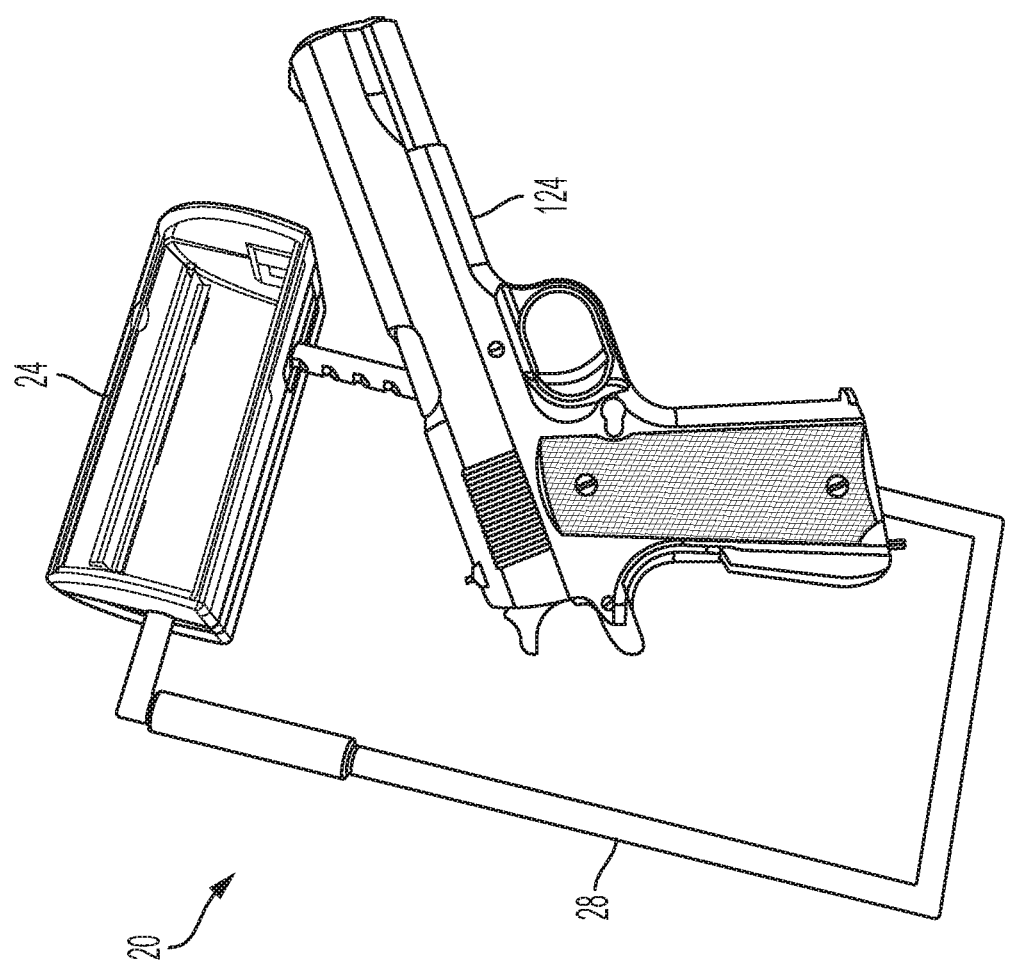
FIG. 7 is a perspective view of the universal locking device of an embodiment of the present invention used in a locking position with respect to a handgun.

Referring to FIG. 7, there illustrated is a perspective view of the universal locking device 20 of an embodiment of the present invention used in a locking position with respect to a handgun 124. For example, the embodiment of the universal locking device 20 illustrated in FIG. 7 is similar to the embodiment of the universal locking device 20 illustrated in FIG. 2. In this embodiment, to lock the handgun 124 the shackle 28 is passed through the firing chamber and ammunition magazine and then out of the bottom of the firearm 124. This is done with the universal locking device 20 in the unlocked position. The shackle 28 is then locked in place within the case 24 of the universal locking device 20 (i.e., the locking mechanism of the universal locking device 20). Thus, in this embodiment the universal locking device 20 of FIG. 7 prevents someone from inserting a magazine loaded with ammunition into the handle of the handgun 124, thereby disabling the firearm 124.

Figure 8:
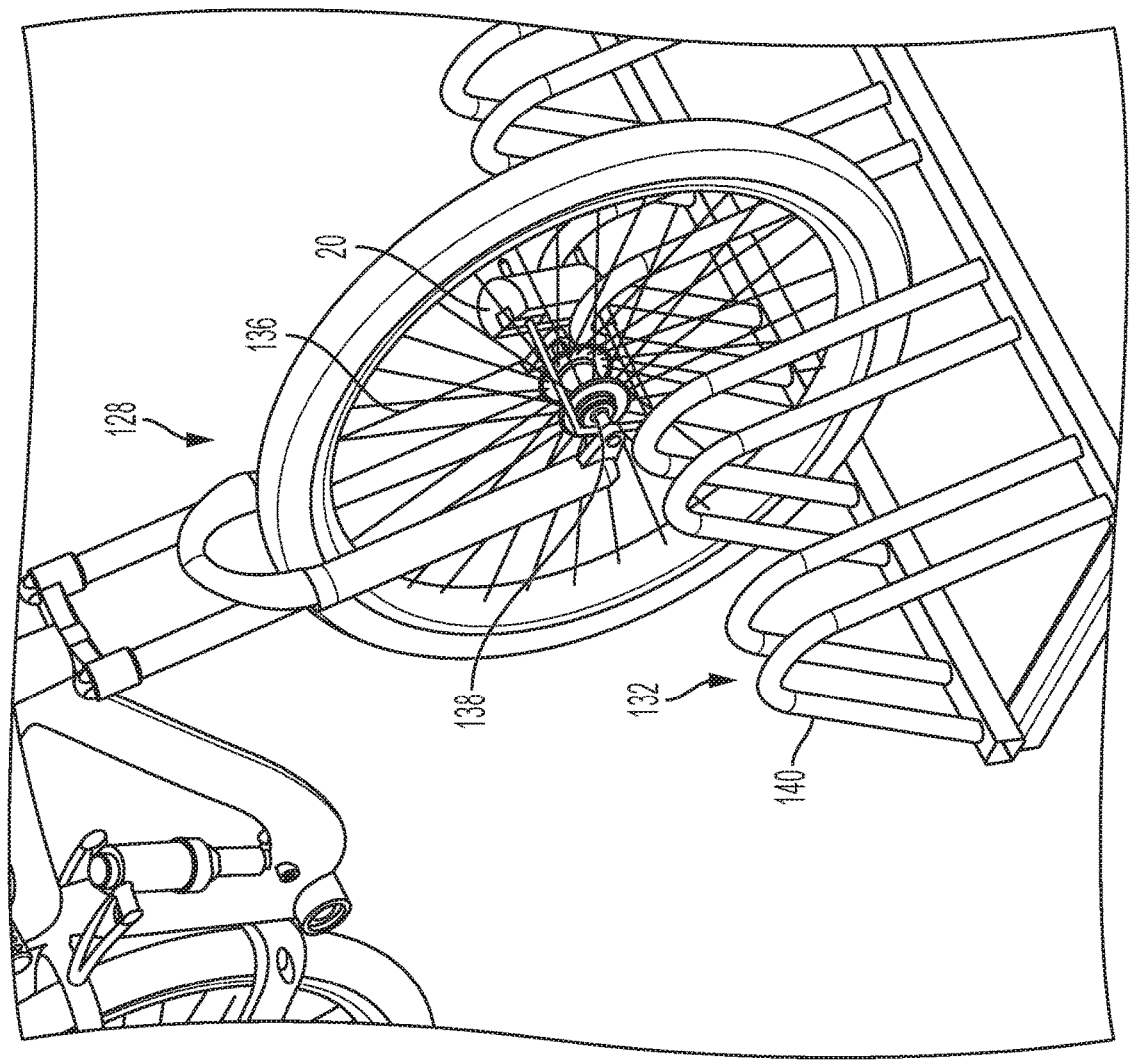
FIG. 8 is a perspective view of the universal locking device of an embodiment of the present invention used in a locking position with respect to a bicycle.

Referring to FIG. 8, there illustrated is a perspective view of the universal locking device 20 of an embodiment of the present invention used in a locking position with respect to a bicycle 128. For example, the embodiment of the universal locking device 20 illustrated in FIG. 8 is similar to the embodiment of the universal locking device 20 illustrated in FIG. 3. However, it should be understood that the embodiment of the universal locking device 20 of FIG. 1 may also be used in this exemplary embodiment of FIG. 8 to lock a bicycle 128. In this embodiment, to lock the bicycle 128 to a common type of bicycle locking stand 132, the shackle 28 is passed through the spokes 136 of the bicycle wheel near the center hub portion 138 of the bicycle wheel and also around one or more of the members 140 of the bicycle locking stand 132. This is done with the universal locking device 20 in the unlocked position. The shackle 28 is then locked in place within the case 24 of the universal locking device 20 to thereby secure the bicycle 128 to the bicycle locking stand 132.

Figure 9:
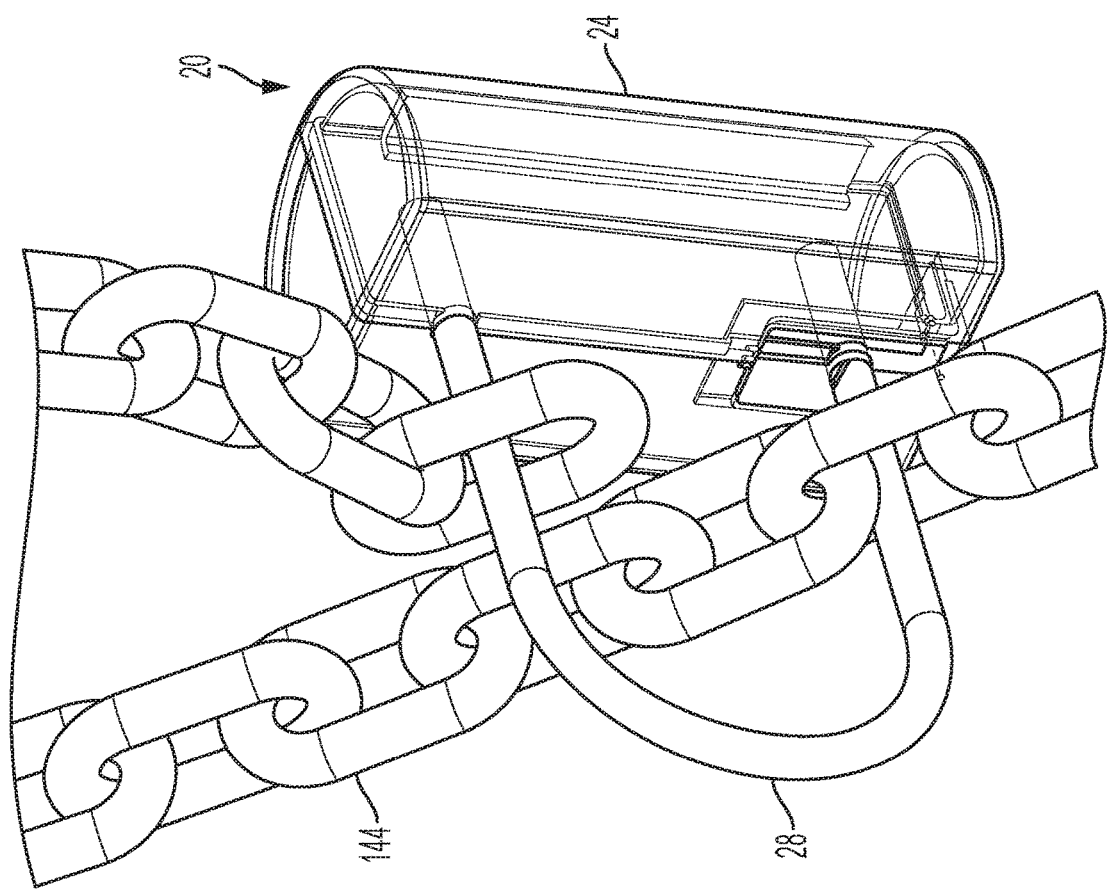
FIG. 9 is a perspective view of the universal locking device of an embodiment of the present invention used in a locking position with respect to a chain that may be attached or secured to one or more objects.

Referring to FIG. 9, there illustrated is a perspective view of the universal locking device 20 of an embodiment of the present invention used in a locking position with respect to a chain 144 that may be attached or secured to one or more objects (not shown). In this embodiment, the universal locking device 20 may be similar to that described and illustrated hereinabove with respect to FIG. 3. However, it is to be understood that any embodiment of the universal locking device 20 may be utilized in the embodiment of FIG. 9.

In this embodiment, the chain 144 may be attached to any of a number of objects. For example, the chain 144 may be used to secure to moving doors on a structure (not shown) such as the two moveable gates of a fence. As such, when the two movable gates are in a closed position, the universal locking device 20 of embodiments of the present invention may be used to secure or lock the two gates in a closed position, thereby preventing anyone from opening the gates and gaining access to what is beyond the fencing.

Figure 10:
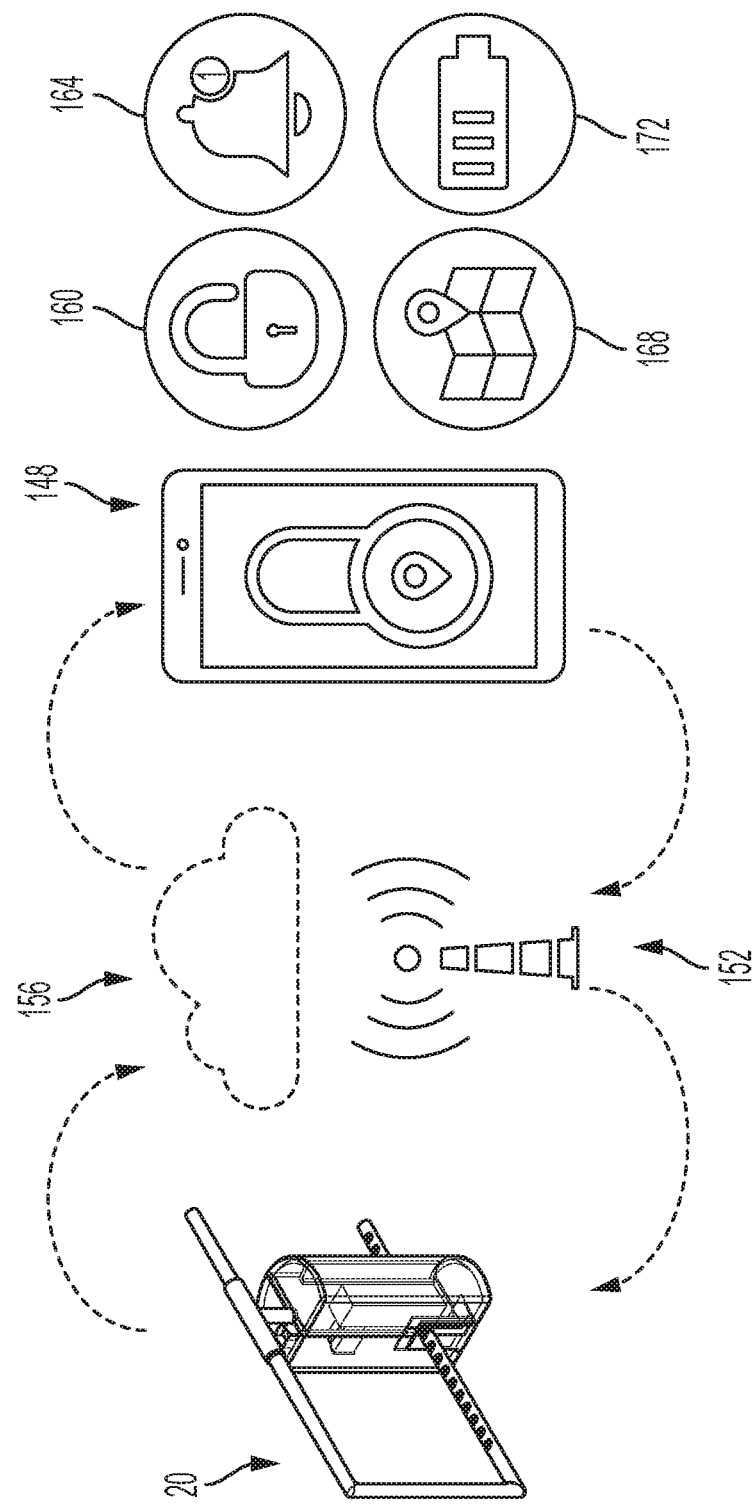
FIG. 10 is a block diagram of a universal locking device, such as the universal locking device shown in FIG. 1, connected wirelessly with a remote device such as a smartphone, in accordance with an embodiment of the present invention.

Referring to FIG. 10, there illustrated is a block diagram of a universal locking device 20, such as the embodiment of the universal locking device 20 illustrated in FIG. 1, connected wirelessly with a remote mobile device 148 such as a smartphone, in accordance with various embodiments of the present invention. The smartphone 148 may be any one of the various iPhone models from Apple which run the iOS operating system or platform, or other smartphones from different manufacturers that run the Android operating system or platform. The iOS and Android operating systems for various smartphones and similar devices are the two most common modern operating systems utilized. It is currently estimated that approximately 99.5% of all smartphones and similar remote devices run either the iOS or Android operating system or platform. As an alternative to a smartphone, the remote mobile device 148 may comprise a tablet, notebook or laptop computer.

A cell tower 152 is illustrated in the embodiment of FIG. 10 to better illustrate that a preferred method of communication between the universal locking device 20 and the remote mobile device 148 is cellular communication. This is because cellular communication provides for relatively greater geographical coverage than WiFi or other more limited geographical telecommunication configurations (e.g., Bluetooth). As can be seen from the written description and drawings herein of the various embodiments of the universal locking device 20 of the present invention, it is important for proper operation of these various embodiments that the universal locking device 20 and the remote mobile device 148 be able to communicate with each other in as much of an area as possible, such as in the United States or other countries. As compared to cellular communications, WiFi has a much more limited area or range of communication connectivity between two devices such as the universal locking device 20 and the remote mobile device 148. As such, WiFi is in general not a good choice for the method and means for communication between the universal locking device 20 and the remote mobile device 148. For example, if embodiments of the universal locking device 20 of the present invention were to utilize WiFi as the method and means for communication with the remote mobile device 148, for a thief to defeat the proper operation of the universal locking device 20 and the remote mobile device 148, the thief merely needs to take either device 20 out of the range of coverage of the WiFi communication network.

Cellular communication networks have become the backbone of telecommunications in the last decade or so. Cellular communication service providers such as Verizon, AT&T, Sprint, and T-Mobile allow clients to use their services through digital mobile telephony systems such as Global System for Mobile communication ("GSM"), Long-Term Evolution ("LTE"), and others. GSM is a standard developed by the European Telecommunications Standards Institute which represent the protocols for cellular networks used by mobile devices. According to the GSM Association, about 82.4% of all global connections are constituted by GSM technologies. This means that most modern smartphones connect to the Internet by GSM communication standards.

Designing a device compatible with digital telephony systems will allow communication with other devices through networks such as the Internet. For example, the universal locking device 20 of embodiments of the present invention may be connected with a large plurality of other types of devices in an Internet of Things ("IoT") configuration. This allows the universal locking device 20 of embodiments of the present invention to interact in real time with various other devices, including various types of home security systems and/or other locking systems.

IoT is a system of interrelated computing devices, mechanical and digital machines with unique identifiers and abilities to transfer data over a network such as the Internet without requiring human interactions. Once the universal locking device 20 is network enabled, the universal locking device 20 will become part of the IoT. That is, the universal locking device 20 will have the ability to communicate with other devices which may send or receive controlling commands to/from the universal locking device 20. A phone, computer, or other IoT devices (e.g., similar to the smartphone 148 of FIG. 10) will be able to automatically communicate with the universal locking device 20 without the need for human control. Without this autonomous communication capability, the universal locking device 20 risks following the same path that current locking technologies are following: i.e., disadvantageous methods and technology which does not extend capabilities and functions.

FIG. 10 also illustrates a cloud data storage 156 that is used in embodiments of the universal locking device 20 of the present invention to store data provided by and utilized by both the universal locking device 20 and the smartphone 148. Once the data is stored in the cloud server 156 by either the universal locking device 20 or the smartphone 148, the data is available for usage by the other one of the universal locking device 20 and the smartphone 148. The cloud server data storage 156 may comprise any commercially available cloud data storage service, such as that provided by Amazon, Google, or any one of a number of other commercially available cloud storage providers.

Data transmission security and storage in embodiments of the universal locking device 20 of the present invention may be enhanced by a data encryption method, such as, for example, the Advanced Encryption Standard ("AES"). AES was established by the U.S. National Institute of Standards and Technology and is used to secure data transmission and provide an end-to-end encryption mechanism between the universal locking device 20 and the remote mobile device 148. The AES encryption method uses a block cipher algorithm to ensure that data is transmitted and stored securely. The data is broken down into blocks that are based on the size of the input data: either 128, 192 or 256 bit long blocks. AES relies on a key that is used to encrypt or decrypt these blocks. When the universal locking device 20 and the remote mobile device 148 both send data to the cloud server 156, the data is received and stored in the form of ciphers. As such, the data can only be decrypted by the respective owner using their key. Thus, third-party or server maintainers are not able to see any user data. This provides for secure data transmission between the universal locking device 20 and the remote mobile device 148 in normal operation of embodiments of the present invention.

The AES encryption method is supported by most architectures including Android, iOS, and many others as it is the standard encryption method of the U.S. Government and major corporations such as Apple, Microsoft, Google and others. Also, no known practicable attacks exist against AES. Therefore, it is used by banks and high security systems around the world. Yet, other data encryption products are available and may be used in embodiments of the present invention. One example is the Data Encryption Standard ("DES") encryption method. Nevertheless, use of industry standards for the various building blocks of embodiments of the universal locking device 20 of the present invention (such as GSM for cellular communications, AES for data encryption, and iOS or Android for the operating system or platform) ensures relatively greater reliability, functionality and compatibility of the resulting universal locking device 20.

FIG. 10 also illustrates various icons 160, 164, 168, 172 that represent each of various functions performed by the aforementioned application program running on the smartphone 148 or other type of remote mobile device. The functions represented by each of these icons 160-172 shown in FIG. 10 are described and illustrated hereinafter with respect to FIGS. 12A-12G.

Further, although not shown in FIG. 10, even though the universal locking device 20 of embodiments of the present invention virtually eliminate the need for a traditional physical key and lock combination to operate the device 20, as a fallback failsafe position, a manual physical key and lock may be used to lock and unlock the universal locking device 20 in the event of an emergency situation such as a malfunction of the universal locking device 20 or of the remote mobile device 148, for example, a failure of the application program running on the smartphone 148, a low battery level, the motor 76 is not able to function, the user does not have access to the smartphone 148, etc.

Figure 11:
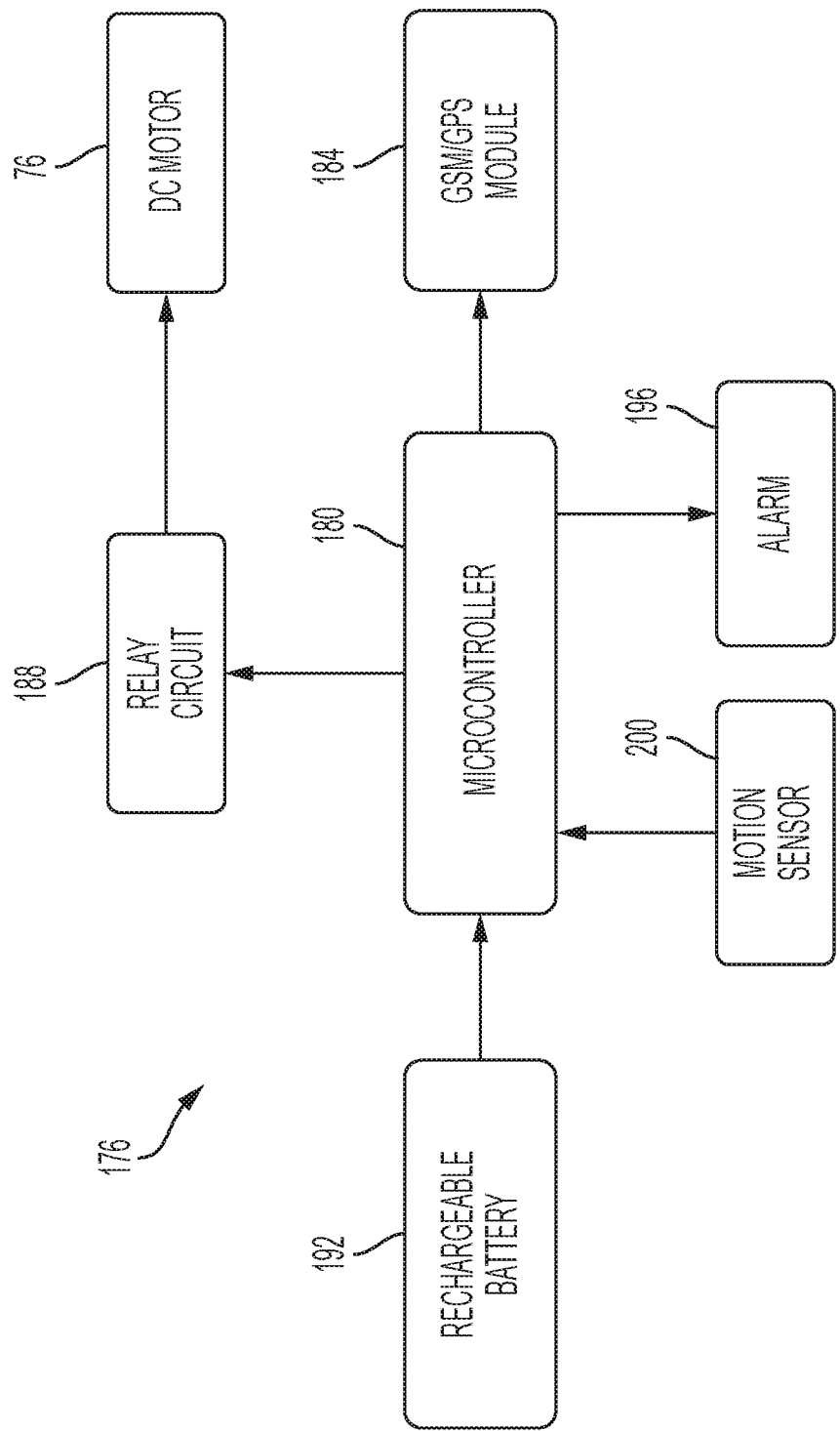
FIG. 11 is a block diagram of various functional circuit components connected together in a circuit and located within the universal locking device of the aforementioned embodiments in accordance with an embodiment of the present invention.

Referring to FIG. 11, there illustrated is a block diagram of various functional circuit component blocks connected together in a circuit 176. The various components that comprise the circuit 176 may be disposed within the case 24 of the universal locking device 20 in accordance with an embodiment of the present invention. These components connected together in the circuit 176 illustrated in FIG. 11 direct and carry out the functionality of the various exemplary embodiments of the universal locking device 20 of the present invention. The circuit 176 also communicates wirelessly with the remote mobile device 148 such as the smartphone.

As with the other components of the various embodiments of the universal locking device 20 of the present invention, the various circuit components illustrated in FIG. 11 may be selected primarily on their ability to carry out the desired functionality, but may also be selected in terms of their cost and also their amount of power consumption. The overall cost of the universal locking device 20 is desired to be affordable and, thus, competitive in the marketplace. Thus, consideration is given to the cost of each component. In addition, since the universal locking device 20 of embodiments of the present invention is powered by rechargeable batteries, as described in more detail hereinafter, consideration is given to the amount of electrical power used or consumed by each component.

Included as part of the circuit 176 is a microcontroller 180 that is configured to interface with the other components in the circuit 176 illustrated in FIG. 11. The microcontroller 180 essentially comprises a small computer or processor that is relatively low cost and uses relatively low power, and is commercially available. In an exemplary embodiment, the microcontroller 180 may comprise the model Nano microcontroller commercially available from Arduino. The Arduino Nano microcontroller is user-friendly, physically small in size, and supports a relatively wide range of data processing operations. However, it is to be understood that relatively more advanced microcontrollers or processors, as compared to the Arduino Nano microcontroller, may be used in other embodiments of the universal locking device 20 of the present invention. Specifically, additional power saving capabilities may be achieved through use of more advance processors, such as Cortex processor family based on the Advanced Risk Machine ("ARM") architecture. The ARM processors offer advance power saving mode that sets the overall system on a sleep mode in order to save power.

As discussed hereinabove, in exemplary embodiments of the present invention, cellular communication is used to implement the method and means for communication between the universal locking device 20 and the remote mobile device 148. In an exemplary embodiment of the universal locking device 20 of the present invention, the aforementioned GSM cellular standard is utilized. As such, the GSM cellular standard function may be implemented by a component 184 within the circuit of FIG. 11 that also implements, in combination, the aforementioned GPS locator or tracking function for the universal locking device 20. In an exemplary embodiment, the combined GSM/GPS component or module 184 may comprise the model SIM808, which is an advanced quad-band GSM cellular receiver that combines GPS technology for satellite localization of the universal locking device 20 in real time and a cellular receiver to handle cellular communication with the remote mobile device 148. The SIM808 GSM/GPS module 184 is commercially available from SIMCOM Wireless Solutions and supports a wide range of GSM frequencies, text messages, data, and voice calling protocols supported by most cellular network providers. With the help of this GSM/GPS module 184, the universal locking device 20 of embodiments of the present invention may connect to the Internet and send data and information such as GPS coordinates of the universal locking device 20 (and, thus of the locked object), battery status, and lock status to users from anywhere that mobile networks are available. A suitable antenna (not shown) is included as well any other components or circuits necessary (e.g., a SIM card) to facilitate the cellular communication between the universal locking device 20 and the remote mobile device 148.

In addition, the GSM/GPS module 184 both sends the encrypted data provided to it by the microcontroller 180 to the cloud server 156 and also receives the encrypted data from the cloud server 156 provided to the cloud server 156 by the remote mobile device 148 and sends that received encrypted data to the microcontroller 180 for processing thereby.

In implementing the GPS function as part of the GSM/GPS module or circuit 184 (or as a separate function apart from the GSM function), the GPS receiver enables the universal locking device 20 of embodiments of the present invention to receive geolocation information at all times from global navigation satellite systems such as the GPS system, which is maintained by the U.S. Air Force. As such, a user of the universal locking device 20 can receive information in real time as to the location of the universal locking device 20, and, thus, of the locked object (e.g., the firearm 124 of FIG. 7). Thus, the user can then tell if the locked object is in a safe location or is being moved in an unauthorized manner, for example, a theft of the locked object is occurring.

The GPS function provides the current longitude and latitude navigation data with a relatively high accuracy, typically within 2.5 meters, and with a relatively fast response time of one second, which is the time required to acquire the satellite signals and the navigation data. However, it is to be understood that other methods beside GPS may be used to determine a current location of the universal locking device 20. For example, another method may be to use the location data from the network provider, although this method is typically not as accurate as the GPS method yet this alternate method can serve as a backup to the GPS method, especially inside buildings where reception of the GPS signals from the satellites may be lacking to some extent.

Still referring to FIG. 11, there illustrated as part of the circuit is a relay circuit 188 and a DC motor (i.e., the motor 76 of FIGS. 5 and 6), where the relay circuit 188 is connected with the microcontroller 180 and the DC motor 76 is connected with the relay circuit 188. As described and illustrated hereinabove with respect to the exploded views of FIGS. 5 and 6 of exemplary embodiments of the universal locking device 20 of the present invention, the rotating output shaft of the DC motor 76 has the spur gear 80 attached thereto. The spur gear 80 may comprise chrome stainless steel or other suitable material. Further, the spur gear 80 physically interfaces with the latch 88 and rotates to move the latch 88 linearly in either of two directions, which results in the latch 88 either being in engagement or disengagement with one of the corresponding notches 48 on the lower arm 40 of the shackle 28. The notches 48 formed on the lower arm 40 of the shackle 28 may be in a saw tooth like arrangement. The latch 88 being in engagement with the lower arm 40 of the shackle 28 results in the universal locking device 20 being in a locked position with respect to an object to be locked. In contrast, the latch 88 being in disengagement with the lower arm 40 of the shackle 28 results in the universal locking device 20 being in an unlocked position with respect to an object to be locked.

The relay circuit 188 is responsive to a control signal provided by the microcontroller 180 to switch between two different directions of the current applied to the DC motor 76, thus allowing the output shaft of the motor 76 to rotate in two different directions. The DC motor 76 may comprise the commercially available motor provided by Micro Metal Gearmotor, which features a nominal voltage of 6 Volts and stall current of 1.6 Amps, which is the maximum current drawn when the motor is applying its maximum torque. At maximum torque output, the DC motor 76 is capable of providing a 15 oz.-in torque and 8 oz.-in at normal operational settings. Regardless, the DC motor 76 utilized in embodiments of the present invention is selected such that its torque force is able to rotate the mechanical spur gear 80 that engages with the notches 48 in the lower arm 40 of the shackle 28. In order for the spur gear 80 to be rotated, the motor 76 is required to produce a force larger than the force of a spring, which holds the gear 80 in place.

It is to be understood that other brands and types of DC motors 76 may be utilized in various embodiments of the universal locking device 20 of the present invention. In general, the locking/unlocking mechanism utilized (i.e., the combined case 24 and shackle 28) will affect the performance of the universal locking device 20. The mechanism utilized to provide hands-free locking and unlocking capabilities is relatively highly dependent on the electrical power available in the universal locking device 20. Generally, electromechanical devices besides DC motors that may be utilized include either a stepper motor, a servo motor, or a solenoid. These alternative devices provide advantages and generate pushing or rotational motion when relatively large amounts of electrical current is applied.

The circuit of FIG. 11 also includes a power source 192 for the universal locking device 20, such as one or more batteries. In embodiments of the universal locking device 20 of the present invention, the batteries 192 are of relatively high capacity and are rechargeable, with a typical operational time of 200 hours between charges, assuming normal usage of the universal locking device 20. In an exemplary embodiment, eight AA size rechargeable batteries 192 may be utilized. In the alternative, lithium ion batteries may be used so long as they are able to meet all of the electrical power requirements of the universal locking device 20 of embodiments of the present invention. As mentioned hereinabove, the electromechanical mechanism (e.g., DC motor 76) utilized is in general the component within the universal locking device 20 that consumes the largest amount of electrical power.

The circuit of FIG. 11 further includes an alarm 196. As discussed hereinabove, the universal locking device 20 of embodiments of the present invention may include the alarm 196 (e.g., an audible alarm having a relatively loud decibel level and/or a visual alarm) as part of the universal locking device 20 itself that is activated if the locked object is tampered with or moved away, e.g., a certain distance, from a location (e.g., a "safe" location) in an unauthorized manner. Although not illustrated in the figures, the alarm 196 may be integrated into the case 24 of the universal locking device 20 in exemplary embodiments of the present invention. In addition as discussed hereinafter with respect to FIGS. 12A-12G, the alarm 196 may also be incorporated as a feature on the remote mobile device 148. This way, a user of the universal locking device 20 who is holding or is located relatively close to the remote mobile device 148 yet is located a far enough distance away from the universal locking device 20 and, thus, from the locked object, and, as a result, cannot hear and/or see the audible and/or visual alarm 192 located on the universal locking device 20, may nevertheless be notified in real time of a condition where someone is attempting to tamper with or steal the universal locking device 20 and/or the locked object (e.g., the handgun 124 of FIG. 7).

As discussed hereinabove, the circuit of FIG. 11 also includes a motion sensor 200, which may comprise an actual motion sensor such as an accelerometer, or may comprise an electrical circuit configured to detect a parameter equivalent to motion. The purpose of the motion sensor 200 is to detect any attempts by someone to tamper with and/or physically move the universal locking device 20 and, thus, the locked object, without authorization. As such, the motion sensor 200 acts as a theft detection circuit. The electrical circuit embodiment of the motion sensor 200 may comprise, in an exemplary embodiment, a closed electrical circuit that becomes opened and, thus, activated by the tampering action. The embodiment of the closed electrical circuit is described and illustrated in more detail hereinafter with respect to FIG. 14.

Referring to FIGS. 12A-12G, there illustrated are various front views of a viewing display screen 204 (i.e., "screen shots") of the smartphone 148 of FIG. 10 in accordance with various exemplary embodiments of the present invention. The smartphone 148 runs an application program that essentially gives the user full control of the entire operation of the universal locking device 20 of the various embodiments of the present invention described and illustrated herein. The smartphone 148 has such a high degree of control of the universal locking device 20, even from remote locations virtually anywhere in the world where cellular communications are available. The application program also provides the smartphone user with essential information about the current status of the universal locking device 20. Thus, the application program allows the smartphone 148 to control, monitor and track the universal locking device 20. The smartphone 148 may be just one type of remote mobile device 148 that may be utilized in embodiments of the present invention. Other types of remote mobile devices 148 that may be utilized include tablet, notebook, or laptop computers.

As discussed hereinabove, the smartphone 148 may be any one of the various iPhone models from Apple which run the iOS operating system or platform, or other smartphones from other manufacturers that run the Android operating system or platform. The iOS and Android operating systems for various smartphones and similar mobile devices are the two most common modern operating systems or platforms utilized for these mobile devices. The selected platform for the application program is preferably widely available, easy to use, and accessible from mobile devices. This makes the universal locking device 20 relatively much more marketable. According to StatCounter, 99.5% of the mobile operating system market share is currently dominated by the iOS and Android operating system. For this reason, both the iOS and Android operating systems or platforms currently are preferred for embodying the application program running on the remote mobile device 148, in accordance with various embodiments of the present invention. However, it is to be understood that other operating systems are contemplated by various other embodiments of the present invention. Further, these various operating systems are utilized instead of a web application that is only accessible from web browsers, which makes it not as widespread as the iOS or Android operating systems. Also, mobile applications are also preferable since they feature built-in navigation functionalities and alerting systems that display notifications to the users through sound and visuals in real-time.

The iOS application program may be developed on Xcode IDE using the Swift programming language, while the Android application program may be developed on Android Studio using the Java programming language. However, other methods and means for development or the application program may be utilized. Specifically, iOS 11 standards and guidelines may be followed to develop the mobile application program. These standards and guidelines include following certain object oriented design methodologies in writing the software and iOS design themes, which promote clarity, easiness, and interactivity in terms of user experience.

Figures 12A, 12B, 12C:
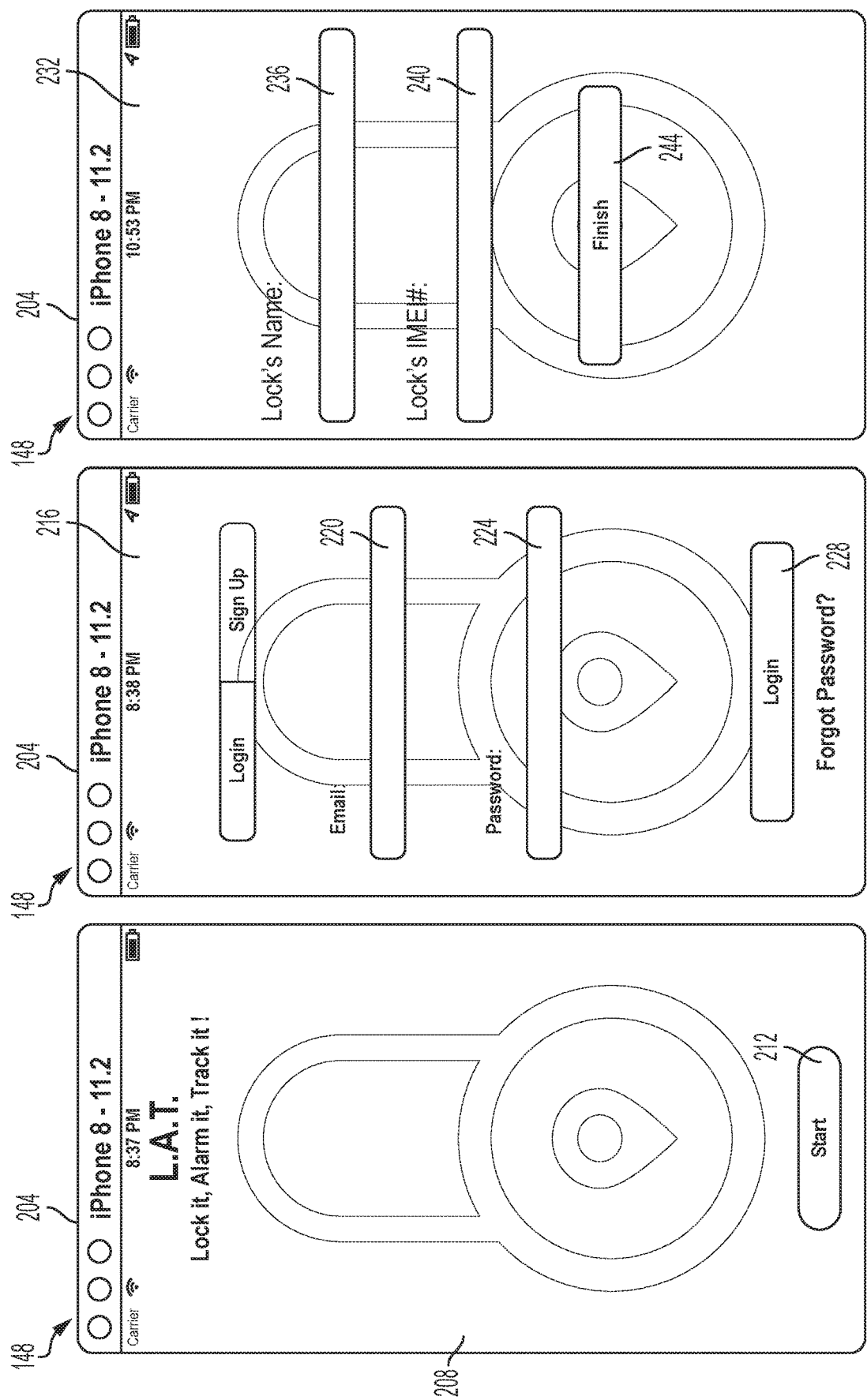
FIGS. 12A-12G are various front views of the viewing screen (i.e., "screen shots") of the smartphone of FIG. 10 in accordance with an embodiment of the present invention.

Referring to FIG. 12A, there illustrated is a screen shot 208 of information displayed to the user on the screen 204 of the smartphone 148 when the user desires to initiate usage of the universal locking device 20 of embodiments of the present invention (i.e., a "start screen"). To start operation of the application program within the smartphone 148, the user may touch or point the cursor to the "Start" icon 212 on the screen 204. The information displayed on the screen shot 208 of FIG. 12A is purely exemplary. Other information may be displayed on the screen shot 208 to the user in other exemplary embodiments of a "start screen" of the present invention, in light of the teachings herein.

Referring to FIG. 12B, there illustrated is a screen shot 216 of information displayed to the user on the screen 204 of the smartphone 148 when the user logs into the application program with the appropriate information of embodiments of the present invention (i.e., a "login screen"). In an embodiment, the application program may request the user to authenticate himself/herself through use of a user login system that requires entry of an email address as a username as well as entry of a password. Initially, a user may be required to sign up to be able to use the application program. This sign up process may be carried out, for example, by the user selecting and providing a desired username (e.g., an email address or some other form of unique user identification) in a field 220 on the screen 204 as well as a password to the smartphone 148 on a field 224 on the screen 204 of FIG. 12B. Use of a unique username and password by each user helps to protect against unauthorized usage of a user's account by someone else. The screen 204 of the smartphone 148 may have touch or cursor activated icons or fields which allow the user to carry out tasks, such as the "login" icons on the screen of FIG. 12B. After the initial sign up procedure is completed, the user is then able to log in to his/her account by simply providing their email address and password and then the user may touch or point the cursor to the "Login" icon 228 on the screen 204. After a user is logged into his/her account on the smartphone 148, the user can control, monitor, and track their one or more universal locking devices 20, as described in more detail hereinafter.

Referring to FIG. 12C, there illustrated is a screen shot 232 of information displayed to the user on the screen 204 of the smartphone 148 when the user desires to add a universal locking device 20 to a list of one or more of these devices 20 on the application program (i.e., an "add a lock screen"). In exemplary embodiments of the present invention, the application program allows users to connect/communicate with and control multiple universal locking devices 20; that is, to separately control each of them and receive status information from each of them. Specifically, the smartphone 148 allows the authorized user to selectively lock and unlock a particular universal locking device 20 that the user is working with and, thus, the corresponding specific object to be locked/unlocked that the particular locking device 20 is being used with.

In exemplary embodiments, each mobile remote device or smartphone 148 may control one or more of the universal locking devices 20, for example, through a scheme for uniquely identifying each universal locking device 20 to the mobile remote device 148. The unique locking device identification may be performed, for example, thorough use of a unique IMEI (International Mobile Equipment Identity) 15 digit number assigned to each one of the universal locking devices 20. The IMEI numbering standard is a unique numerical identifier assigned to every broadband or mobile device. Thus, the one or more universal locking devices 20 are matched up with their appropriate owner by the application program by utilizing the locking device's IMEI number and the user's account information (e.g., username and password).

Therefore, it can be seen from FIG. 12C that when a user is adding a locking device 20 to their application program, the user enters a name chosen by the user for the particular universal locking device 20 into a name field 236 on the screen 204. The name chosen may be one that is easy to remember and is unique to each device 20. The user also enters the IMEI number of the particular universal locking device 20 into the IMEI number field 240 on the screen 204. The user then may touch or point the cursor to the "Finish" icon 244 on the screen 204 to complete the "add a lock" task. Once a particular universal locking device 20 is added by a user to the application program on the smartphone 148, the user will be able to control and receive status information from universal locking devices 20 that are only registered under the user's account. This way, user data is protected and restricted to the respective user. Although not shown in the figures, a screen shot may exist in which a list of all of the universal locking devices 20 registered to a user of a particular smartphone 148 is displayed.

Figure 12E:
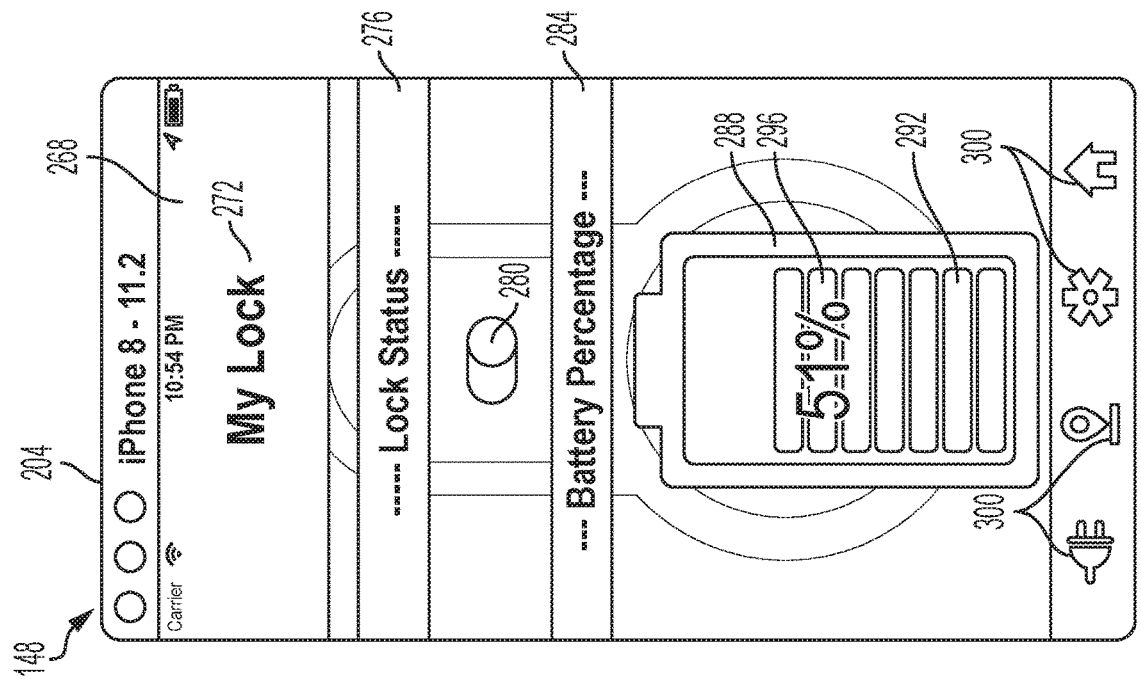
Figure 12D:
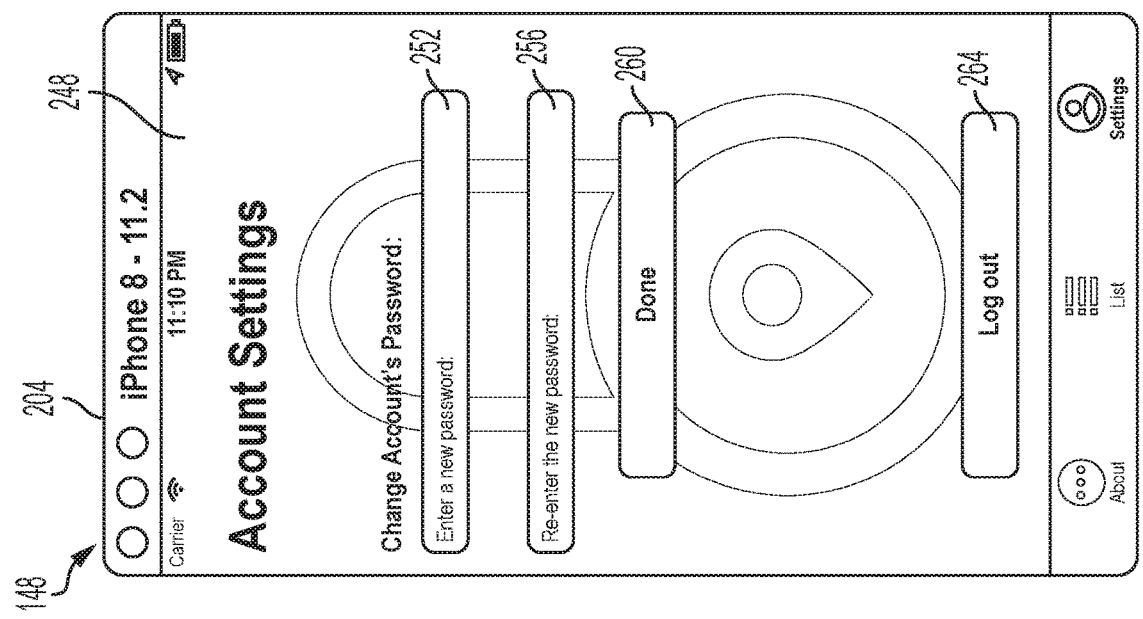

Referring to FIG. 12D, there illustrated is a screen shot 248 of information displayed to the user on the screen 204 of the smartphone 148 when a user desires to change certain settings within the application program (i.e., an "account settings screen"). For this function, the user enters a new password in a field 252 on the screen 204, and then re-enters the new password in another field 256 on the screen 204. The user may then may touch or move the cursor to the "Done" icon 260 on the screen 204 to complete the "account settings" task. On this screen shot 248, the user may also may touch or move the cursor to the "Log Out" icon 264 on the screen 204 to log out of his/her account in the application program.

Referring to FIG. 12E, there illustrated is a screen shot 268 of information displayed to the user on the screen 204 of the smartphone 148 when a user desires to change the locked status of a particular universal locking device 20 programmed into that user's account from locked to unlocked or from unlocked to locked (i.e., a "lock's status screen"). The name of the locking device 20 may be displayed in a field 272 on the screen 204, for example, the name "My Lock." Underneath may be a field 276 named "Lock Status" that contains a field 280 with a button that can be moved by the user by a touch or the cursor from left to right when the user desires to lock the particular "My Lock" universal locking device 20, or from right to left when the user desires to unlock the particular "My Lock" universal locking device 20.

The same "lock's status" screen shot 268 illustrated in FIG. 12E may also include a field named "Battery Percentage" 284 with a type of visual indicator 288 that indicates the amount of life left in the batteries at that any particular point in time. Here, the exemplary visual indicator 288 may comprise a vertical level indicator 292 of colored bars combined with a numerical percentage indication 296 of the amount of battery life remaining.

The screen shot 268 of FIG. 12E also has a number of icons 300 located on the bottom of the screen 204 of the smartphone 148. These icons 300 provide status information to the user, including, for example, whether or not the batteries 192 are plugged into a battery charger for recharging, an alarm 196 that visually notifies the user that a tampering condition is currently occurring with a particular universal locking device 20 (this visual alarm may be combined with an audible alarm that is sounded on the smartphone 148 when the tampering condition is occurring), a lock status icon that indicates whether the particular universal locking device 20 is locked or unlocked, and a home icon that the user can touch or place the cursor on to go to a home screen within the application program. These icons 300 may also appear on other screen shots of the smartphone in various embodiments of the present invention.

Figure 12G:
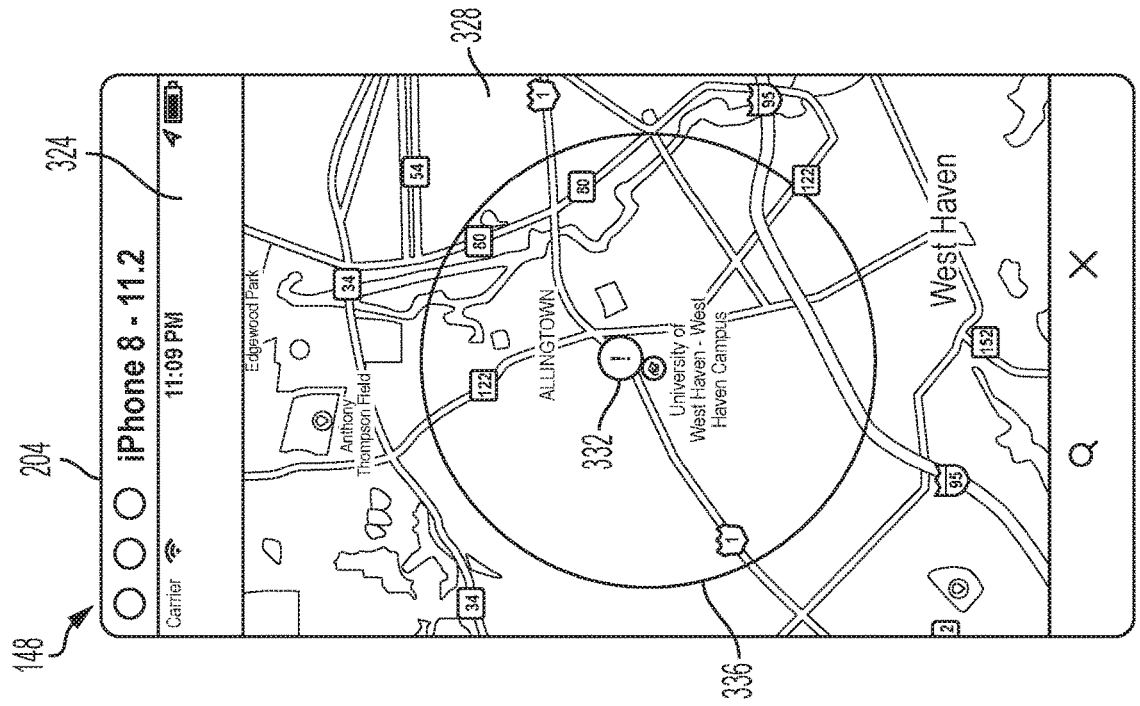
Figure 12F:
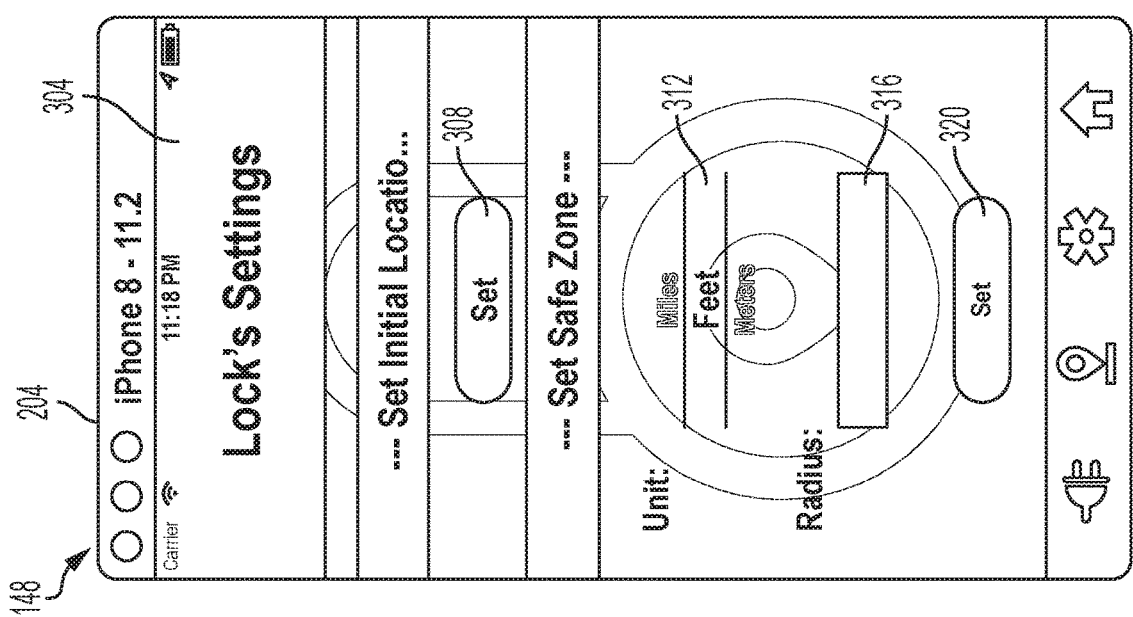

Referring to FIG. 12F, there illustrated is a screen shot 304 of information displayed to the user on the screen 204 of the smartphone 148 when a user desires to set an initial location of a particular universal locking device 20 and also set a safe zone for any movement of the universal locking device 20 (i.e., a "lock's settings screen"). The initial location of a particular universal locking device 20 may be obtained from the aforementioned GPS function. The user can request that this initial location be set within the application program by the user hitting a "Set" field button 308 on the screen 204. The user also may set a safe zone, which is an allowed amount of movement of the particular universal locking device 20 from the set initial location. The user may set the desired amount of the safe zone by selecting the units of measure, for example, miles, feet, meters, etc. using a touch dial indicator 312 on the screen 204, and then entering a corresponding number in a "Radius" field 316 for the desired amount of allowed movement of the particular universal locking device 20. Once this information has been entered, the user may touch or move the cursor to the "Set" icon 320 on the screen 204 to complete the "Set Safe Zone" task.

Essentially the safe zone is a measure of how much movement of the particular universal locking device 20 within a circular radius amount from the initial set location that the user will allow before the user desires the alarm 196 to sound both on the particular universal locking device 20 and on the smartphone 148 to alert the user and someone else, e.g., someone attempting to steal the universal locking device 20 and the corresponding locked object, that such a theft situation is occurring. Thus, the safe zone allows for some amount of ordinary movement of the particular universal locking device 20 without any concern for a theft condition occurring.

Referring to FIG. 12G, there illustrated is a screen shot 324 of information displayed to the user on the screen 204 of the smartphone 148 that visually shows the current location of a particular universal locking device 20 (i.e., a "lock's location screen"). A two dimensional map 328 of the general area that the particular universal locking device 20 is currently located in is shown on the screen 204. Also illustrated in the screen shot 324 of FIG. 12G is a visual marker 332 that illustrates the exact current location of the particular universal locking device 20, as determined by the GPS function described and illustrated in detail hereinabove. Further illustrated in the screen shot 324 of FIG. 12G is a circular safe zone 336. From this information the user can determine the exact current location of the particular universal locking device 20 and that location with respect to the safe zone 336 of allowed movement of the device 20.

Figure 13:
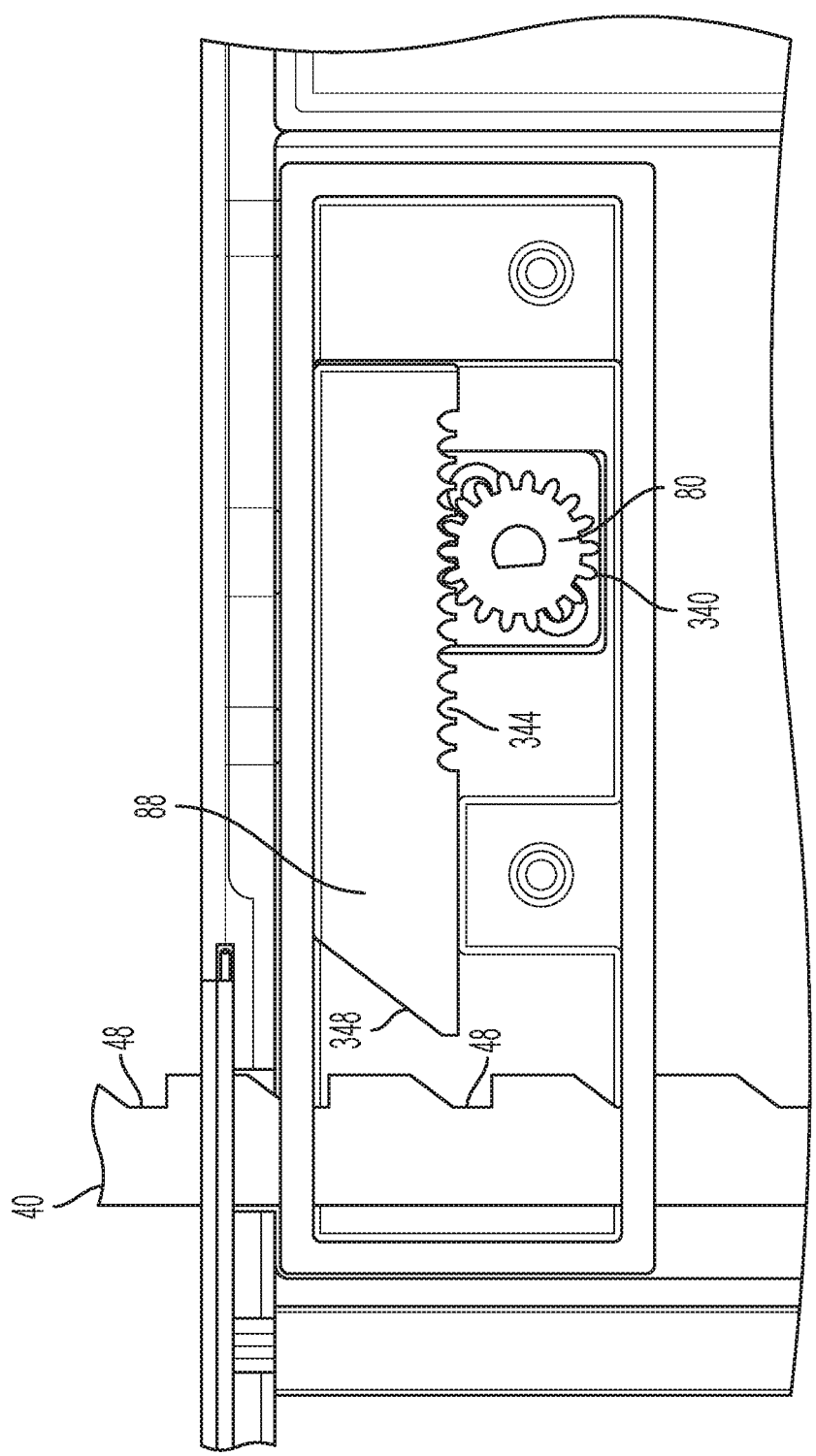
FIG. 13 is a front view of a portion of a latch mechanism and a shackle of the universal locking device in accordance with an embodiment of the present invention.

Referring to FIG. 13, there illustrated is a front view of a portion of each of the latch 88 and the lower arm 40 of the shackle 28 of the universal locking device 20 in accordance with an embodiment of the present invention. The teeth 340 of the spur gear 80 are illustrated in contact with notches 344 in the latch 88. The left edge 348 of the latch 88 is shown in FIG. 13 as being disposed away from any of the notches 48 in the lower arm 40 of the shackle 28. Thus, FIG. 13 illustrates the universal locking device 20 in an unlocked position. In contrast, when the left edge 348 of the latch 88 is within one of the notches 48 of the lower arm 40 of the shackle 28, the universal locking device 20 is in a locked position.

Figure 14:
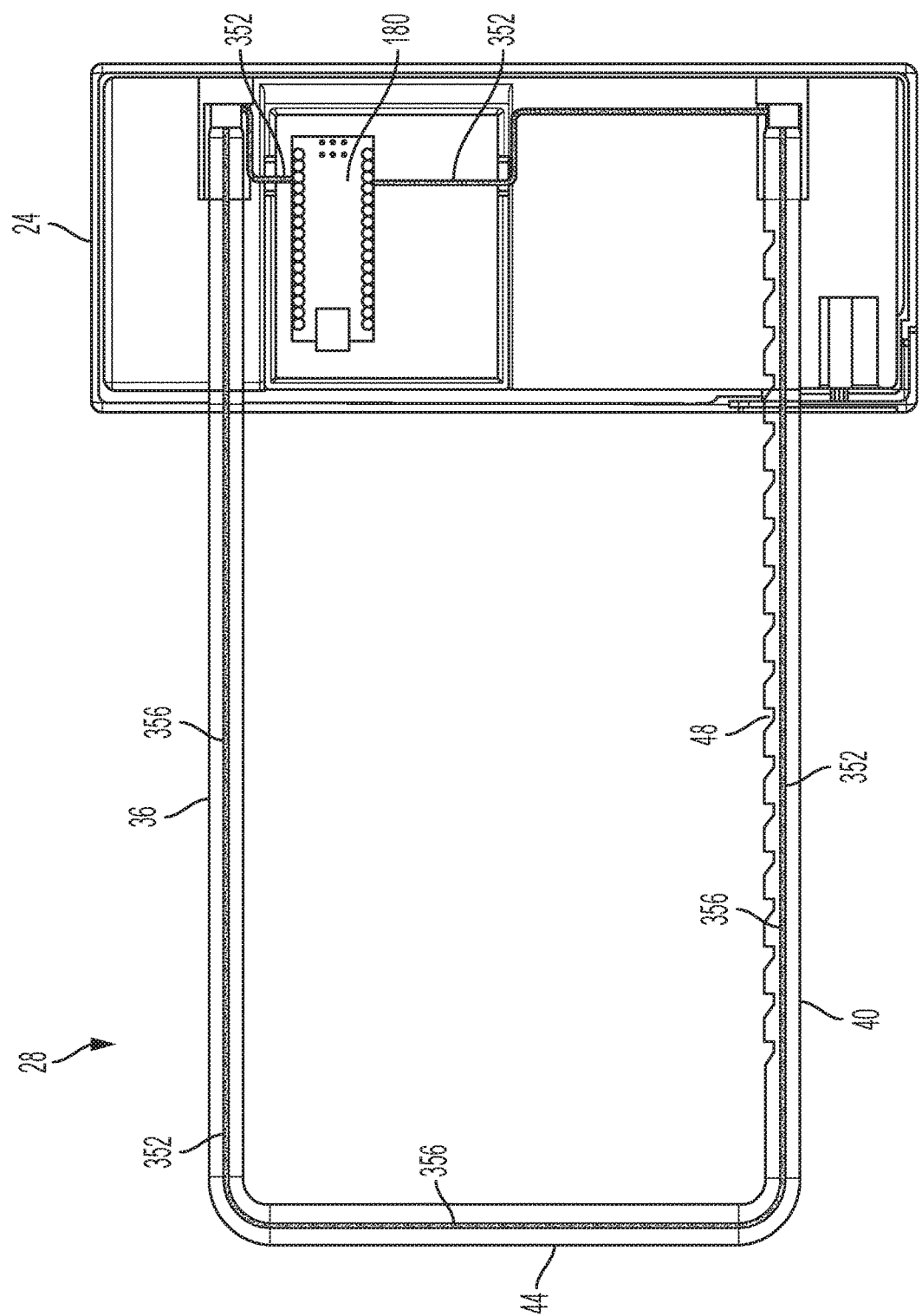
FIG. 14 is a schematic diagram of a wired tampering circuit wired through a shackle portion of the universal locking device and connected with a microcontroller in accordance with an embodiment of the present invention.

Referring to FIG. 14, as discussed hereinabove, there illustrated is a schematic diagram of an electrical circuit configured to detect any unauthorized tampering or movement of the universal locking device 20 and, thus, of the locked object (e.g., the handgun 124 of FIG. 7). In the embodiment illustrated in FIG. 14, the electrical circuit is a closed type of circuit wherein an electrical wire 352 is disposed in a bore hole 356 formed in the shackle 28. The wire 352 is connected at each end to corresponding inputs of the microcontroller 180. As discussed hereinabove, the shackle 28 may comprise a unitary piece of material or may comprise two opposing halves of material joined together. Regardless, the bore hole 356 is formed along the entire length of the shackle 28, and the wire 352 is disposed therein. The closed type of theft detection electrical circuit operates by sensing or detecting any unauthorized tampering of the universal locking device 20 by way of a breaking of the wire connection with the microcontroller 180, for example, by someone cutting through the shackle material, thereby breaking the wire 352. This breaking of the wire 352 causes a corresponding opening of the closed electrical circuit, which is sensed by the microcontroller 180.

However, it is to be understood that the broadest scope of the present invention is not limited to the closed wired electrical circuit embodiment illustrated in FIG. 14 and described hereinabove. Instead, other types of means and methods for detecting any unauthorized tempering with the universal locking device 20 may be utilized. For example instead of the wire 352 placed in the bore hole 356 of the shackle 28, a light beam, such as that provided by a laser light source, may be projected into one end of the bore hole 356 and be made to travel through the bore hole 356 to the other end of the bore hole 356 where it is sensed. As such, the sensed presence or absence of the light beam may indicate whether or not the universal locking device 20 is being tampered with. It should be apparent to one of ordinary skill in the art in light of the teachings herein that other types of closed or opened circuit configurations may be employed to detect tampering of the universal locking device 20 in various embodiments of the present invention.

While the invention had been described with reference to the exemplary embodiments disclosed herein, is should be readily understood by one of ordinary skill in the art that the invention is not to be limited to those disclosed embodiments. Rather, various changes and modifications may be made without departing from the scope of the invention. Accordingly, the invention is not to be seen as being limited by the foregoing description, but is only limited by the scope of the appended claims.

What is claimed is:
1. A locking device comprising:
a locking mechanism configured to physically interact with any one of a plurality of different types of objects to thereby lock and unlock the any one of a plurality of different objects upon a corresponding command communicated from a remote device controlled by a user, wherein the remote device is separate from the locking device;
a motion sensor configured to sense any physical motion of the locking device and to provide a sensed motion signal indicative thereof;
an alarm responsive to the sensed motion signal and configured to provide at least one of a visual and audible alarm signal upon an occurrence of at least one predetermined condition corresponding with a sensed physical motion of the locking device;
a location tracker configured to continuously sense a location in physical space of the locking device and to provide a location signal indicative thereof;
a communication module configured to be in two-way signal communication with the remote device;
wherein the remote device transmits a plurality of signals to the communication module, one or more of the transmitted plurality of signals to the communication module being indicative of a corresponding one or more commands from the user to operate the locking device to lock and unlock the locking mechanism;
wherein the communication module transmits a plurality of signals to the remote device, one or more other ones of the transmitted plurality of signals to the remote device being indicative of a status of a corresponding one or more parameters of the locking device; and
a processor configured to be responsive to and for signal processing of the sensed motion signal, the at least one visual and audible alarm signal, the location signal, the one or more of the transmitted plurality of signals to the communication module, and the one or more of the transmitted plurality of signals to the remote device, wherein the locking mechanism comprises a case and a shackle, wherein the shackle is movable with respect to the case into one of a locked position and an unlocked position upon the corresponding commands communicated from a remote device controlled by the user to lock and unlock the any one of a plurality of different types of objects, and wherein the shackle contains a bore hole therethrough, wherein a wire is disposed with an entire length of the bore hole and is connected at both ends to the processor, wherein the motion sensor detects any tampering of the locking mechanism when there occurs a break in the wire.

* * * * *